United States Patent
Kunce

(10) Patent No.: US 7,373,274 B2
(45) Date of Patent: May 13, 2008

(54) METHODS AND STRUCTURE FOR IMPROVED INTERACTIVE STATISTICAL ANALYSIS

(75) Inventor: Jim D. Kunce, Overland Park, KS (US)

(73) Assignee: ERC-IP, LLC, Overland Park, KS (US)

( * ) Notice: Subject to any disclaimer, the term of this patent is extended or adjusted under 35 U.S.C. 154(b) by 0 days.

(21) Appl. No.: 10/617,315

(22) Filed: Jul. 10, 2003

(65) Prior Publication Data

US 2005/0021286 A1    Jan. 27, 2005

(51) Int. Cl.
*G06F 17/18* (2006.01)

(52) U.S. Cl. .................... 702/179; 707/104.1

(58) Field of Classification Search ........... 702/57, 702/80, 123, 179, 181, 189, 199; 707/2–4, 707/10, 101–102, 104.1; 715/701–702, 740, 715/777, 744–745, 769–770
See application file for complete search history.

(56) References Cited

U.S. PATENT DOCUMENTS

| | | | |
|---|---|---|---|
| 5,852,819 A * | 12/1998 | Beller ............................ 707/1 |
| 6,005,560 A | 12/1999 | Gill et al. |
| 6,023,694 A * | 2/2000 | Kouchi et al. .................. 707/2 |
| 6,026,397 A | 2/2000 | Sheppard |
| 6,366,299 B1 | 4/2002 | Lanning et al. |
| 6,473,080 B1 | 10/2002 | Brown et al. |
| 6,631,382 B1* | 10/2003 | Kouchi et al. ............. 707/102 |
| 2002/0087705 A1 | 7/2002 | Smyth |
| 2002/0099586 A1 | 7/2002 | Bladen et al. .................. 705/7 |
| 2002/0133504 A1* | 9/2002 | Vlahos et al. ............. 707/104.1 |
| 2002/0138318 A1 | 9/2002 | Ellis et al. ....................... 705/7 |
| 2002/0184068 A1 | 12/2002 | Krishnan et al. |
| 2002/0198750 A1 | 12/2002 | Innes et al. |
| 2003/0036087 A1* | 2/2003 | Kaushikkar et al. ........... 435/6 |
| 2003/0037063 A1 | 2/2003 | Schwartz ................... 707/104.1 |
| 2003/0112234 A1 | 6/2003 | Brown et al. |
| 2003/0120589 A1 | 6/2003 | Williams et al. .............. 705/38 |
| 2003/0160818 A1 | 8/2003 | Tschiegg et al. |
| 2003/0191780 A1* | 10/2003 | Heger et al. ............. 707/104.1 |
| 2003/0229509 A1 | 12/2003 | Hall et al. ....................... 705/1 |
| 2004/0015422 A1 | 1/2004 | Glick et al. .................... 705/34 |
| 2005/0021286 A1 | 1/2005 | Kunce ........................ 702/179 |

FOREIGN PATENT DOCUMENTS

EP    1209851 A2 *  5/2002

OTHER PUBLICATIONS

Selections from Web Risk Management website, including homepage page, Web Risk Manager™ Modules page, Web Risk Manager News page, and attached brochure, [online] [retrieved on Feb. 3, 2005], retrieved from the Internet at URL: <http://www.webriskmanagement.com/home.asp>, 8 pages total.

(Continued)

*Primary Examiner*—Eliseo Ramos-Feliciano
*Assistant Examiner*—Mary Catherine Baran
(74) *Attorney, Agent, or Firm*—Lee & Hayes, PLLC

(57) ABSTRACT

Methods and associated structure for flexible, easy-to-use, robust, statistical analysis of one or more factors associated with a continuous response outcome. A simple user interface provides a wide variety of statistical analysis derived from user provided data. The user provides data in a simple tabular format after which no further human intervention is required to manipulate the data. Data is automatically manipulated and transformed as required to perform the desired, selected statistical analysis. Reduction of human interaction in manipulating data to perform desired statistical analysis improves statistical analysis processes by reducing human errors introduced in data manipulation and encouraging users to perform more thorough analysis because time-saving shortcuts are no longer required.

38 Claims, 18 Drawing Sheets

OTHER PUBLICATIONS

U.S. Appl. No. 60/372,291, filed Apr. 12, 2002, entitled "Risk Management Information Interface System and Associated Methods."

U.S. Appl. No. 10/815,099, filed Mar. 30, 2004, entitled "Strategies for Managing Recommendations."

U.S. Appl. No. 10/411,912, filed Apr. 12, 2003, entitled "Risk Management Information Interface System and Associated Methods."

Beroggi, et al., "Operational Risk Management," Engineering and Technology Management, 1998, Pioneering New Technologies: Management Issues of the Third Millennium, IEMC '98 Proceedings, International Conference on Oct. 11-13, 1998, pp. 447-451.

* cited by examiner

FIG. 7

| | A | B | C | D | E | F | G |
|---|---|---|---|---|---|---|---|
| 1 | Set-Up / Clear DB Sheet / Initialize Tool / Re-Load Data | SSS for All Selected X's / Main Effects Only / By Specified Order / All Possible Orders | Additional Functions / SPAN Analysis / Standardize a Y / Group a Field to a New X | | Save Results / Get Transfer Function | DATA | NINJA |
| 2 | | Significant Factor Specifications | | 09/08/2002 00:09:00 Macro Start Time | | | |
| 3 | | Minimum Record Count: | 1 | 09/08/2002 00:09:08 Macro Stop Time | | | |
| 4 | | Maximum P Value ( α ): | 0.05 | 00:00:08 Run Time | | | |
| 5 | | Minimum Test Power (1 - β): | 90% | Row Color | | | |
| 6 | | "Above" Filter Value: ☐ Use "Above" Filter | 2.00 | | X (Filter) Y (Response) | | |
| 7 | | "Below" Filter Value: ☐ Use "Below" Filter | -2.00 | | Not Applicable | | |
| 8 | | | | | | | |
| 9 | X / Y | Database Fields | X Level / Y Metric Selector | X Filter | Analyze Top N Elements | Element Order / Y Weight Selector | Total Element Count In DB |
| 10 | Y | On_Time_Delivery | | | | | |
| 11 | X | Customer_Type | | | | | |
| 12 | | ▼eography | | | | | |
| 13 | X | arket_Type | | | | | |
| 14 | Y | ccount_Representative | | | | | |
| 15 | | Credit_Rating | | | | | |
| 16 | | Material_Available | | | | | |
| 17 | | | | | | | |
| 18 | | | | | | | |
| 19 | | | | | | | |

Instructions / DB / Start / Table Output / Chart Output / SPAN Analysis / Output log / Stat Seg / TF-Form / TF-Data

| 9 | X / Y | Database Fields |
|---|---|---|
| 10 | Y | On_Time_Delivery |
| 11 | X | Customer_Type |
| 12 | | ▼eography |
| 13 | X | arket_Type |
| 14 | Y | ccount_Representativ |

| | | Group a Data Field | | ☒ |
|---|---|---|---|---|
| Filed Name | On_Time_Delivery ▼ | | | # of Percentile Auto-groups |
| New X Label | Alpha-Numeric Range | | | |
| 1-24 Percentile | -111 | <= x < | -3 | |
| 25-49 Percentil | -3 | <= x < | 0 | 2 |
| 50-74 Percentil | 0 | <= x < | 4 | 3 |
| 75-100 Percent | 4 | <= x < | 166 | 4 |
| | | <= x < | | 5 |
| | | <= x < | | 6 |
| | | <= x < | | 7 |
| | | <= x < | | 8 |
| | | <= x < | | 9 |
| | | <= x < | | 10 |

OK  Cancel

FIG. 11

| | A | B | C | D | E | F | G |
|---|---|---|---|---|---|---|---|
| 1 | Set-Up | SSS for All Selected X's | | Additional Functions | | | |
| | Clear DB Sheet | Main Effects Only | | SPAN Analysis | Save Results | | |
| | Initialize Tool | By Specified Order | | Standardize a Y | Get Transfer Function | DATA | |
| | Re-Load Data | All Possible Orders | | Group a Field to a New X | | | |
| 2 | | Significant Factor Specifications | | 09/08/2002 00:09:00 Macro Start Time | | | |
| 3 | | Minimum Record Count: | 1 | 09/08/2002 00:09:08 Macro Stop Time | | NINJA | |
| 4 | | Maximum P Value ( α ): | 0.05 | 00:00:08 Run Time | | | |
| 5 | | Minimum Test Power (1 - β): | 90% | Row Color | | | |
| 6 | | "Above" Filter Value: ☐ Use "Above" Filter | 2.00 | | X (Filter) Y (Response) | | |
| 7 | | "Below" Filter Value: ☐ Use "Below" Filter | -2.00 | | Not Applicable | | |
| 8 | | | | | | | |
| 9 | X/Y | Database Fields | X Level / Y Metric Selector | X Filter | Analyze Top N Elements | Element Order / Y Weight Selector | Total Element Count In DB |
| 10 | Y | On_Time_Delivery | | | | | |
| 11 | X | Customer_Type | | | | | 3 |
| 12 | X | Geography | | | | | 4 |
| 13 | X | Market_Type | | | | | 2 |
| 14 | X | Account_Representative | | | | | 4 |
| 15 | X | Credit_Rating | | | | | 3 |
| 16 | X | Material_Available | | | | | 3 |
| 17 | X | On_Time_Delivery_GROUPED | | | | | 5 |
| 18 | | | | | | | |

Start / Table Output / Chart Output / SPAN Analysis / Output log / Stat Seq / TF-Form / TF-Data /

| 15 | X | Credit_Rating |
|---|---|---|
| 16 | X | Material_Available |
| 17 | X | On_Time_Delivery_GROUPED |
| 18 | | |

| X / Y | Database Fields | X Level / Y Metric Selector | X Filter | Analyze Top N Elements | Element Order / Y Weight Selector | Total Element Count In DB |
|---|---|---|---|---|---|---|
| Y | On_Time_Delivery | MEDIAN | | | | |
| X | Customer_Type | 1 | | | | 3 |
| X | Geography | 1 | | | | 4 |
| X | Market_Type | 1 | | | | 2 |
| X | Account_Representative | 1 | | | | 4 |
| X | Credit_Rating | 1 | | | | 3 |
| X | Material_Available | 1 | | | | 3 |

*FIG. 14*

| X / Y | Database Fields | X Level / Y Metric Selector | X Filter | Analyze Top N Elements | Element Order / Y Weight Selector | Total Element Count In DB |
|---|---|---|---|---|---|---|
| Y | On_Time_Delivery | MEDIAN | | | | |
| X | Customer_Type | 1 | | | | 3 |
| X | Geography | 1 | | | | 4 |
| X | Market_Type | 1 | Commercial ▼ | | | 2 |
| X | Account_Representative | 1 | Commercial / Industrial | | | 4 |
| X | Credit_Rating | 1 | | | | 3 |
| X | Material_Available | 1 | | | | 3 |

*FIG. 15*

| X / Y | Database Fields | X Level / Y Metric Selector | X Filter | Analyze Top N Elements | Element Order / Y Weight Selector | Total Element Count In DB |
|---|---|---|---|---|---|---|
| Y | On_Time_Delivery | MEDIAN | | | | |
| X | Customer_Type | 1 | | 50 | | 3 |
| X | Geography | 1 | | | | 4 |
| X | Market_Type | 1 | Commercial | | | 2 |
| X | Account_Representative | 1 | | | | 4 |
| X | Credit_Rating | 1 | | | | 3 |
| X | Material_Available | 1 | | | | 3 |

*FIG. 16*

| Significant Factor Specifications | |
|---|---|
| Minimum Record Count: | 1 |
| Maximum P Value ($\alpha$): | 0.05 |
| Minimum Test Power ($1 - \beta$): | 90% |
| "Above" Filter Value: ☐ Use "Above" Filter | 2.00 |
| "Below" Filter Value: ☐ Use "Below" Filter | -2.00 |
FIG. 17
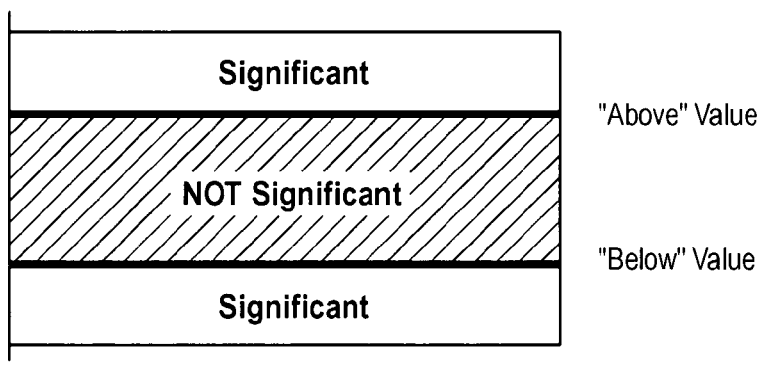
FIG. 18
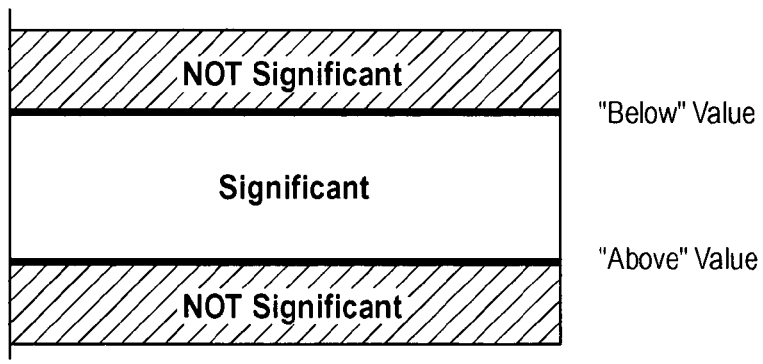
FIG. 19

STATISTICAL STRAT-SEG OUTPUT FOR: On_Time_Delivery

| Row | MEDIAN | Main Effects | 2nd Order Interactions | 3rd Order Interactions | 4th Order Interaction |
|---|---|---|---|---|---|
| 10 | 0.000 | TOTAL | TOTAL | TOTAL | TOTAL |
| 11 | 0.000 | Account_Representative : Leslie | Market_Type : Commercial | | |
| 12 | -1000 | Account_Representative : Leslie | Market_Type : Commercial | | |
| 13 | -3.000 | Account_Representative : Leslie | Market_Type : Commercial | Material Available : No Part Required | |
| 14 | 1000 | Account_Representative : Leslie | Market_Type : Commercial | Material Available : Parts Available | |
| 15 | 6.000 | Account_Representative : Leslie | Market_Type : Commercial | Material Available : Parts Ordered | |
| 16 | 8.000 | Account_Representative : Leslie | Market_Type : Commercial | Material Available : Parts Ordered | Customer_ |
| 17 | 1000 | Account_Representative : Leslie | Market_Type : Industrial | | |
| 18 | -2.000 | Account_Representative : Leslie | Market_Type : Industrial | Material Available : No Part Required | |
| 19 | 5.000 | Account_Representative : Leslie | Market_Type : Industrial | Material Available : Parts Ordered | |
| 20 | 7.000 | Account_Representative : Leslie | Market_Type : Industrial | Material Available : Parts Ordered | Geography |
| 21 | 6.000 | Account_Representative : Leslie | Market_Type : Industrial | Material Available : Parts Ordered | Geography |
| 22 | -3.000 | Account_Representative : Leslie | Market_Type : No Part Required | | |
| 23 | 5.500 | Account_Representative : Leslie | Market_Type : Parts Ordered | | |
| 24 | -1000 | Account_Representative : Mark | | | |
| 25 | -2.000 | Account_Representative : Mark | Market_Type : Commercial | | |
| 26 | -3.000 | Account_Representative : Mark | Market_Type : Commercial | Credit_Rating : A | |
| 27 | -4.000 | Account_Representative : Mark | Market_Type : Commercial | Credit_Rating : A | Customer_ |
| 28 | -5.000 | Account_Representative : Mark | Market_Type : Commercial | Credit_Rating : A | Geography |
| 29 | -3.500 | Account_Representative : Mark | Market_Type : Commercial | Credit_Rating : A | Material_A |
| 30 | 4.000 | Account_Representative : Mark | Market_Type : Commercial | Credit_Rating : A | Material_A |
| 31 | 0.000 | Account_Representative : Mark | Market_Type : Commercial | Credit_Rating : A | Customer_ |
| 32 | -5.000 | Account_Representative : Mark | Market_Type : Commercial | Credit_Rating : A | Customer_ |
| 33 | -3.000 | Account_Representative : Mark | Market_Type : Commercial | Credit_Rating : A | Customer_ |

*FIG. 20*

METHODS AND STRUCTURE FOR IMPROVED INTERACTIVE STATISTICAL ANALYSIS

BACKGROUND

In a number of business and scientific environments, statistical information is gathered and analyzed to identify or otherwise extract useful information from often voluminous collections of data. One common application of statistical analysis is to study processes or systems to identify the impact of different categorical (non-continuous) factors on a continuous response outcome.

For example, it may be useful to study the impact different variables have on a typical commercial measure, such as average time in line for customers of a fast food restaurant. Some of the categorical factors generally expected to effect this exemplary outcome (time in line) may include: menu type, number of checkout registers, number of order takers, number of cooks, number of on-duty managers, presence of a drive-through feature in the restaurant, presence of a playground for entertaining children, location of the restaurant, etc. The results of such statistical analysis help show an analyst which elements have a significant statistical effect on the response outcome (i.e., average time in line for customer). Conversely, the analysis helps identify which elements have no statistical fact on the observed outcome. Given such analysis, further computations may develop a mathematical model to predict future outcomes based on measures of statistically significant factors.

Current techniques and systems used for such statistical analysis are time-consuming and cumbersome to use. Though a number of automated tools can assist a user in such analysis, present techniques and systems remain heavily reliant on manual aspects of the process. Such manual processes induce numerous errors due to frequent manipulation of the data through human processes. Further, human nature tends to identify shortcut solutions for complex tasks to reduce time required for the task. Often, therefore, the analysis is incomplete as user shortcuts may eliminate relevant data from the statistical analysis process.

Previous methods and systems utilized for such statistical analysis have included graphical analysis tools where selected outcome response information is plotted or graphed for each element or for interaction between various elements. Such a graphical presentation helps a user identify significant elements through visual inspection. As noted above, these graphical analysis techniques often require significant human interaction to manipulate the data into an appropriate format for the desired graph or plot. In addition, the visual inspection of data becomes cumbersome where a significant number of elements or factors may be involved. Viewing tens or hundreds of independent elements to determine relative significance of the various elements can be overwhelming for an average person.

Another common type of tool used for such statistical analysis includes single factor interaction hypothesis test analysis tools. In such tools, the outcome response for a single factor interaction is manually calculated and a hypothesis test is performed. Such a method is cumbersome where large numbers of elements or factors are involved. Each hypothesis test requires manual interaction to initiate the process and to view the resultant test output.

Still another prior technique often utilized for such statistical analysis is a so-called general linear model in which a dummy variable is established for each element or interaction among elements. The dummy variable indicates a simple, binary presence (value 1) or absence (value 0) of the specified element. A regression analysis may then be performed to determine a coefficient and to determine significance of each element or each interaction of elements. As above, such a technique is cumbersome at best where there are large numbers of factors or elements. It becomes difficult to discern useful information regarding the elements for each response and to determine whether the data is normalized or not. The method is further deficient where statistical measurements other than the mean of the outcome response are to be tested. Numerous other useful statistical measures are not feasible in such a general linear model of statistical analysis.

These various tools known to provide assisted statistical analysis often utilize commercially available statistical engines such as MINITAB. Information regarding MINITAB is readily available at, for example, MINITAB'S website.

It is evident from the above discussion that a need exists for an improved statistical analysis tool that provides, at once, flexibility in a variety of statistical analyses to be performed, ease-of-use to encourage users to perform thorough analysis, and reduced human interaction in manipulation of data to provide desired statistical analysis.

SUMMARY

The present invention advances the state of the useful arts by providing methods and associated structure for an improved user interface for statistical analysis of data. More specifically, features and aspects hereof provide methods and associated structure for a simple user interface coupled with significant flexibility in statistical analysis and presentation. Other features and aspects reduce human interaction in the manipulation of data required to generate desired statistical information.

A first feature hereof provides a computer system user interface for statistical analysis. The user interface has a data entry display screen configured to receive user input providing tabular data. A configuration and control display screen is configured to receive user input selecting a particular statistical analysis to be performed on the tabular data. Statistical computation means are responsive to user input received in the configuration and control display screen to perform the particular statistical analysis using the tabular data entered by user input in the data entry display screen to generate statistical results. The statistical computation means is operable to retrieve and reformat the tabular data without user interaction. A results page display screen is responsive to the statistical computation means and responsive to user input received in the configuration and control display screen to format and display results of the statistical analysis.

Another feature provides a method for statistical analysis. The method starts by receiving user input identifying desired analysis. Next, user data is retrieved from a data store and the retrieved data is reformatted in accordance with the desired analysis. The method then computes factors for the desired analysis using the reformatted data and formats output from results of the computation for presentation to the user. Lastly, the formatted output is presented to the user in response to input from the user requesting output presentation. The method is substantially automated such that the steps of retrieving, reformatting computing and formatting are automated in response to the initial step of receiving. The method is otherwise substantially devoid of interaction with the user for receiving input.

Another feature provides a method for enhanced statistical analysis. The method starts by presenting a spreadsheet to a user on a display wherein the spreadsheet comprises a plurality of pre-defined pages. Next the method receives tabular data in a canonical form storing the data in a data page of the plurality of pre-defined pages. The method then receives configuration input using a user interaction page of the plurality of pre-defined pages wherein the configuration input indicates a type of statistical analysis to be performed. Next the tabular data is automatically reformatted in accord with the type of statistical analysis. The indicated statistical analysis is automatically performed without further interaction wherein the statistical analysis identifies a significant factor in the tabular data. Lastly, results are generated by the statistical analysis in a result page of the plurality of pre-defined pages wherein the results identify the significant factor.

BRIEF DESCRIPTION OF THE DRAWINGS

FIG. 7 is a version of the configuration and control display screen of FIG. 5 with additional detail shown for assigning a type to data fields.

FIG. 10 is exemplary of a pop-up dialog display useful for entering information to define a grouped X type element as a new data field.

FIG. 11 is a version of the configuration and control display screen of FIG. 5 with additional detail showing addition of a grouped X type element as a data field.

FIG. 13 is exemplary of a display screen useful for user entry of tabular data

FIGS. 14, 15 and 16 each show a portion of the configuration and control screen of FIG. 5 with a respective portion highlighted for defining attributes and parameters of the desired statistical analysis.

FIG. 17 shows a portion of the configuration and control display screen of FIG. 5 useful for defining specifications used in determining significance of a possible factor.

FIGS. 18 and 19 show use of the "above" filter and "below" filter of FIG. 17 to define ranges of significant factors.

FIG. 20 is exemplary of a textual output display of the results of stratification and segmentation statistical analysis.

DETAILED DESCRIPTION OF THE DRAWINGS

Figure 1:
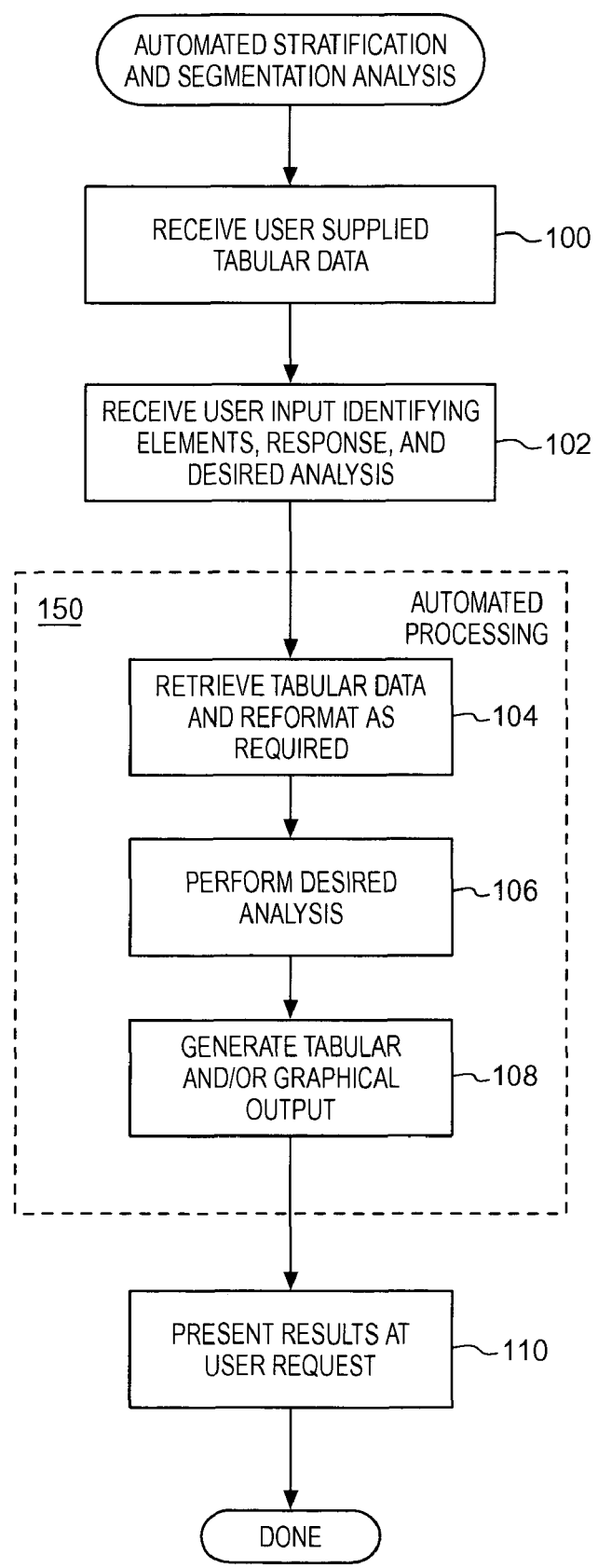
FIG. 1 is flowchart describing a method for automated stratification and segmentation statistical analysis.

FIG. 1 is a flowchart describing processing of a method to provide improved, automated statistical analysis including data segmentation and data stratification. Overall, the method provides for receiving user supplied data in a simple, tabular format and receiving indications from a user as to the type of analysis to be performed. Statistical analysis then proceeds in a substantially automated fashion such that the statistical analysis is largely devoid of need for further user interaction. Results of the requested statistical analysis may be formatted for presentation to the user in tabular form and/or graphical form.

Element 100 of FIG. 1 is operable to receive user supplied data in a simple tabular form. In one embodiment, a user enters data into a data input page or worksheet of a standard spreadsheet program such as Microsoft Excel. Alternative approaches may obtain such tabular data from other automated sources including, for example, existing database structures or legacy systems. Such data may be provided through a computer communication link such as a local area network or a wide area network.

Element 102 then receives further user input to identify one or more response elements in the user supplied data that may vary as a function of one or more other identified elements in the user supplied tabular data. The other elements are identified by the user as possible contributing factors with respect to the identified response. The possible factors and response are identified by user input as particular columns of the tabular data supplied by the user in element 100 discussed above. Those of ordinary skill in the art will recognize numerous techniques for receiving such user input including, for example, keyboard generated input, pointer device input, voice command input, etc.

Having received user supplied tabular data and associated identification information, automated processing 150 then proceeds to perform statistical analysis identified by the user from input at received element 102. As will be discussed further, various forms of statistical analysis are provided by automated processing 150 including, for example, automated stratification and segmentation of the supplied tabular data.

Automated processing 150 includes element 104 to retrieve the tabular data entered by the user and to reformat the retrieved data as required for performing the identified analysis. In addition, element 104 may optionally record the reformatted data in a database or oilier persistent storage structures to permit more rapid retrieval of the reformatted data, thus obviating the need for subsequent reformatting if identical analysis is later requested. Element 106 represents processing to perform the desired statistical analysis requested by the user input at element 102. Details of exemplary statistical analysis are provided hereinbelow. Results of the desired statistical analysis of element 106 are then generated and formatted in tabular form, graphical form, or both by operation of element 108. Particular exemplary formats and presentations of tabular results and/or graphical results are discussed further below. The generated results from element 108 are then presented to a user by operation of element 110. Presentation of textual or graphical output information to a user by operation of element 110 may be performed by presentation on a user display screen, printed output, generated speech output, or other output media appropriate to a particular desired application.

Figure 2:
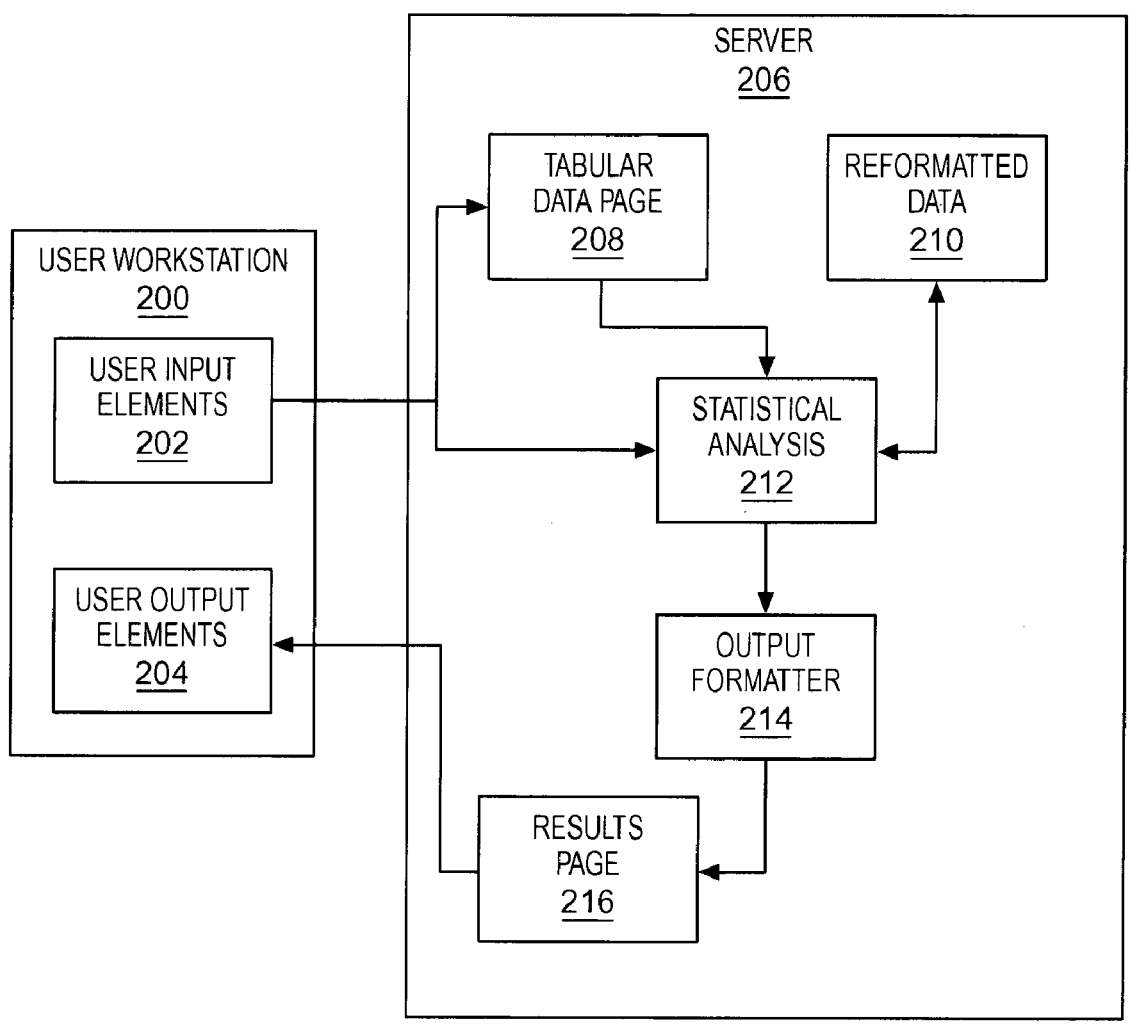
FIG. 2 is a block diagram of a system for automated stratification and segmentation statistical analysis.

FIG. 2 is a block diagram of elements of one system for improved interactive statistical analysis. In general, a user utilizes a user workstation 200 coupled to a server 206 embodying elements described herein. User input elements 202 of user workstation 200 provide user input information to the various elements and processes operable within server 206. User input elements 202 may include a number of standard user interface structures and techniques including, for example, keyboard input elements, pointer device input elements, touch screen user input elements, voice recognition user input elements, etc. User output elements 204 in user workstation 200 provide means for presenting to a user information generated by structures and processes within server 206.

Server 206 includes storage and processing elements for performing substantially automated statistical analysis upon user supplied tabular data in accordance with user input. In particular, tabular data page 208 represents a storage element for receiving and retaining user supplied tabular data. As noted above, in one exemplary embodiment, tabular data page 208 may be a worksheet page display of a typical spreadsheet program such as Microsoft Excel. Statistical analysis element 212 performs the user identified statistical analysis techniques on the user supplied tabular data. Statistical analysis element 212 receives user input identifying the particular type of analysis to be performed. Depending upon the selected analysis, statistical analysis element 212 may also reformat data supplied by the user and stored in tabular data page 208. The reformatted data may be retained for subsequent retrieval in reformatted data element 210. Results of the statistical analysis of element 212 are applied to output formatter 214 for appropriate formatting for presentation to the user. The results may be formatted as tabular textual information, graphical representations of such tabular information, or both. Formatted output generated by element 214 may then be stored in results page 216 accessible by the user to permit the user to review the tabular textual information, graphical information, or both.

Those of ordinary skill in the art will readily recognize that the various elements and processes depicted in FIGS. 1 and 2 may be implemented within a single computing device or may be distributed over a plurality of computing and storage elements coupled through appropriate networking infrastructure. Such distributed computing and storage paradigms are well-known to those of ordinary skill any art and may be implemented in numerous structures as a matter of design choice. Further, the processes associated therein may utilize well known client/server computing structures and techniques or may be integrated as a single programmed structure. Such design choices are also well known to those of ordinary skill in the art.

Figure 3:
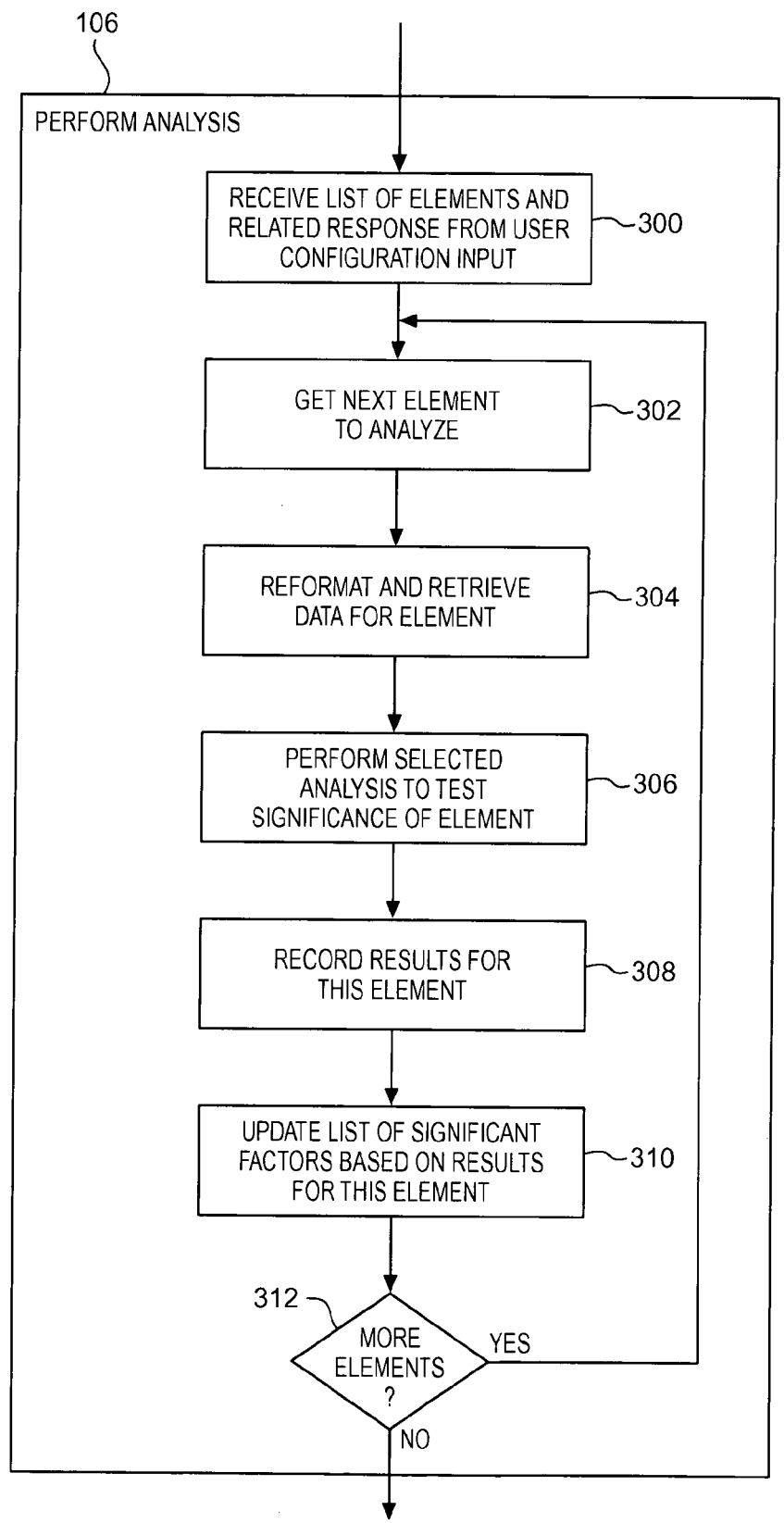
FIG. 3 is a flowchart providing additional details of the analysis described in FIG. 1.

FIG. 3 provides additional details of the structure and operation of element 106 of FIG. 1 for performing desired statistical analysis on identified elements and responses in the user supplied tabular data. Element 300 is first operable to receive a list of elements and related responses from user input provided earlier as discussed above with respect to FIG. 1. Elements 302 through 312 are then iteratively operable on each of the identified elements to determine statistical significance of each elements with respect to the identified responses. In particular, element 302 is operable to get the next (first) element to be analyzed. Element 304 then performs any required retrieval and reformatting of data corresponding to the identified next element to the process.

As noted above, data may be retrieved from the user supplied data page in which the user entered data in a simple, tabular form. Reformatting may entail any of a number of options including, for example, scaling of values retrieved, conversion of values retrieved into different units, normalizing of values retrieved, etc. Further, as noted above, previously retrieved and reformatted data may be entered into a database or other persistent storage for subsequent rapid retrieval. Element 304 may therefore also retrieve data corresponding to an identified element by retrieving previously reformatted data from the database repository. Element 306 is then operable to perform the particular selected analysis to test the identified element for significance as a factor as it relates to the identified response. Element 308 then records the computed results of element 306 for further processing. Further processing of the results may entail formatting of the computed significance of this element as a factor for presentation as discussed above in tabular or graphical format at the request of the user. Element 310 next updates a list of significant factors based on the results determined by element 306 and recorded by element 308. The list of significant factors may be maintained in a sorted order as the degree of significance of each element is determined. Element 312 then determines if further elements have been identified by the user for significance analysis with respect to the identified response. If more elements remain to be processed, one method of element 106 continues by looping back to element 302 to process a next identified element for statistical significance analysis. If no further elements remain to be processed, the analysis of element 106 is completed and further postprocessing continues as discussed above with respect to FIG. 1.

When all elements have been processed by element 106 of FIG. 3, the list of significant factors generated and sorted by processing of element 310 may be used to present information to the user identifying significance of the various elements as factors in generation of the identified response. Still further details regarding particular statistical analysis performed by element 306 are provided later with respect to FIG. 4. Those of ordinary skill in the art will readily recognize that any number of identified elements may be processed by the statistical analysis of element 106. Further, each element may be analyzed for significance with respect to any number of responses identified by the user. Numerous equivalent iterative methods will be readily apparent to those of ordinary skill in the art for processing such a plurality of elements with respect to one or more identified responses.

Substantially automated statistical processing techniques enable a user to, among other things, find statistically (and practically) significant factors affecting a given response within user supplied tabular data. In general this statistical method entails stratification and segmentation of the data. Stratification of the data, in general, means extracting a portion of the user supplied data based upon some statistical selection criteria. Segmentation of the data, in general, means dividing the user supplied data into sub-groups of related portions of data. Processing to identify significant factors in data uses such stratification and segmentation to determine significance. Such processing is referred to herein as Statistical Stratification-Segmentation processing (or SSS processing).

Figure 12:
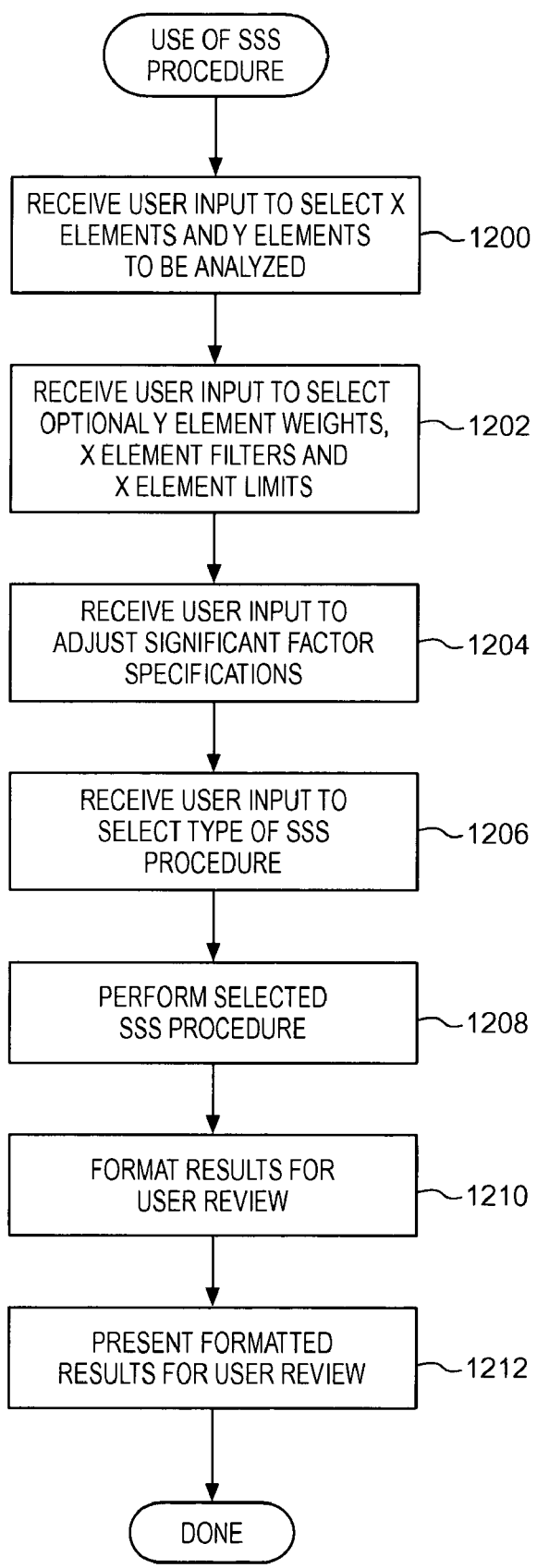
FIG. 12 is a flowchart describing a method for automated stratification and segmentation statistical analysis.

FIG. 12 is a flowchart describing processing to perform one statistical stratification and segmentation analysis. Element 1200 is first operable to receive user input identifying X type elements and Y type elements in user supplied data.

Entry of user supplied data is discussed further hereinbelow. In general, user supplied data is entered in tabular form where particular columns of data may be identified as X type elements and other columns of data may be identified as Y type elements. An exemplary process for permitting a user to identify the type of each element in the user supplied tabular data is discussed below. Having so identified the X type elements and Y type elements to be analyzed, element 1202 is next operable to receive user input selecting optional weighting information for Y type elements as well as filter and limit information for X type elements. More generally, element 1202 receives characterization information that may be used in determining significance of a possible factor. Element 1204 is next operable to receive user input providing adjustments to the desired specifications for identifying a "significant" factor among the selected X elements. As discussed further below, user input may modify specifications that define which factors are to be considered "significant."

Element 1206 is next operable to receive user input identifying which of a plurality of SSS procedures should be used to identify significant factors. A number of computational techniques may be applied in identifying significant factors from among the selected X type elements. Element 1208 is then operable to perform the selected SSS procedure to identify significant factors among the selected X type elements with respect to the identified Y type elements (responses). Element 1210 then formats the computed results for presentation to the user and element 1212 presents the formatted results to user.

In general, the SSS procedures may use a similar algorithm for determining significant levels of each of the identified X type elements. As used herein, "level" refers to values in the user supplied data for a particular field or column of data. Levels may represent numeric values or ranges of numeric values where the corresponding element is a numeric field. A level may also represent textual values or ranges of textual values where the corresponding element so requires.

The algorithm first determines factors that have significant levels as a main effect on the identified Y element (response). Next, second order effects are determined as combinations of two possible factors—a main effect factor and another factor. Third order effects are determined by the effect of three possible factors in combination—a main effect factor, a second order effect factor and another factor. Higher order effects (i.e., fourth, fifth, etc.) are determined in a manner analogous to the determination of second and third order effects.

Figure 22:
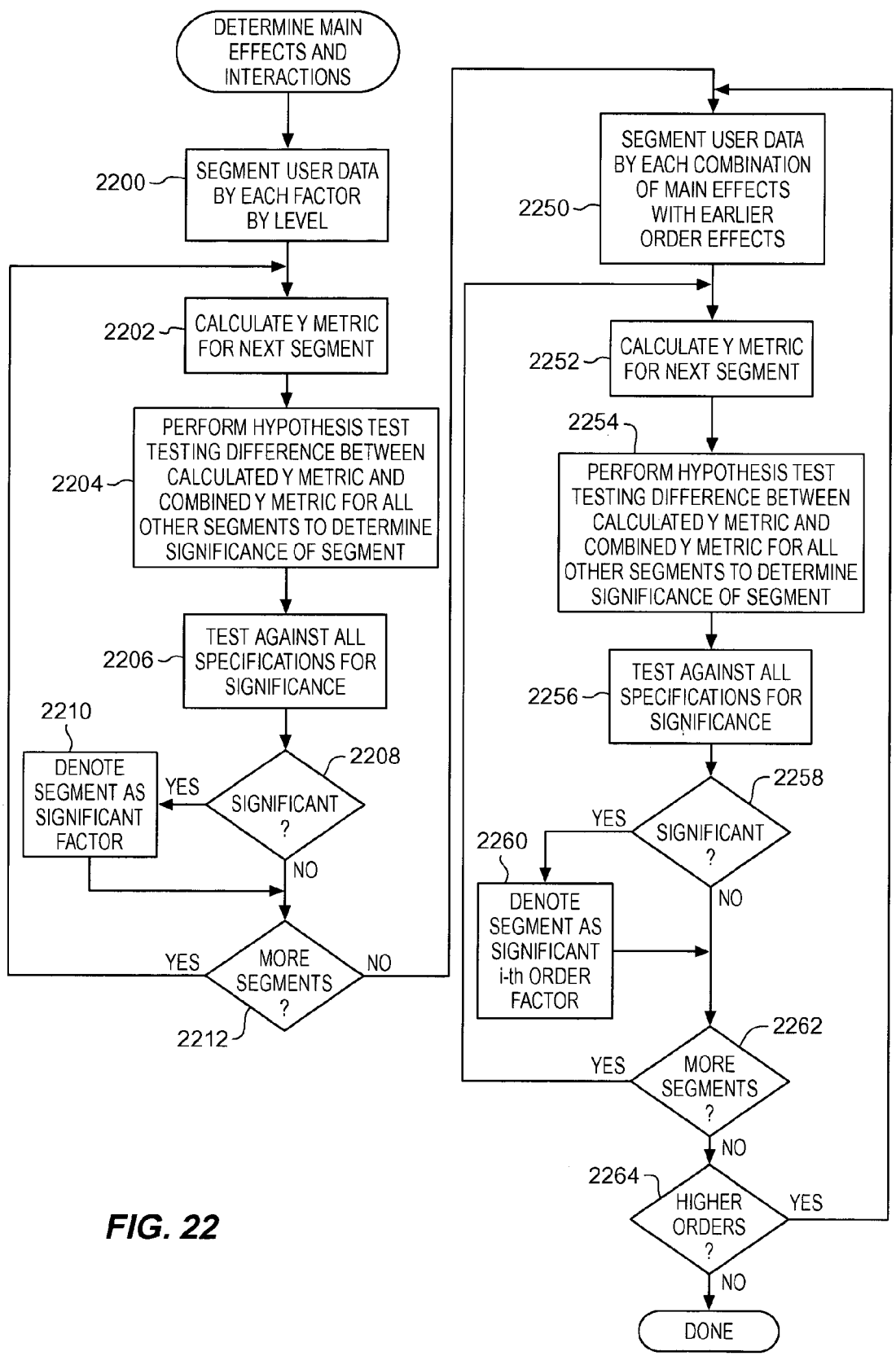
FIG. 22 is a flowchart describing a method for determining main effects and higher order effects in the statistical analysis.

The flowchart of FIG. 22 provides additional details of the computations performed by element 1208 above to provide this algorithmic solution. In particular, elements 2200 through 2212 of FIG. 22 determine significant main effect factors while elements 2250 through 2264 determine higher order interactions of factors with previously determined significant factors. More specifically, in one exemplary embodiment that limits the orders of interaction analysis to six, elements 2250 through 2264 are iteratively operable to determine interactions of order one through six.

Element 2200 first segments the user supplied data by each possible factor (i.e., X element) and by each level within a factor. Element 2202 then calculates a Y metric for a next segment as determined by element 2200. Element 2204 performs hypothesis testing determining a difference between the calculated Y metric for the segment and the combined Y metric for all other segments to thereby determine significance of the segment presently being processed.

The Y metric so computed for the present segment under test is then compared against all specifications of significance by operation of element 2206. Element 2208 then determines if the present main effect passes all significance tests according to the specifications for significance. If so, element 2210 denotes this segment as a significant factor in the main effect order of analysis. In either case, element 2212 determines whether more segments generated by element 2200 are yet to be processed by elements 2202 through 2210. If so, processing continues by looping back to element 2202. Otherwise, processing continues by testing for higher order effects in combinations of significant factors determined at earlier levels of interaction. In particular, element 2250 again segments the user supplied data but this time according to combinations of previously determined main effects and other higher order effects previously determined (if any). With the data so segmented, elements 2252 through 2262 are operable in the same manner as elements 2202 through 2212 described above. Elements 2252 through 2262 are generally operable to identify significant factors at the present higher order of interaction under study. When all significant factors at the present order of interaction have been identified, element 2264 is operable to determine whether additional still higher orders of interaction are to be evaluated. If so, processing continues by looping back to element 2250 to identify still higher order levels of interaction. If not, processing of the method of FIG. 22 is completed.

Figure 4:
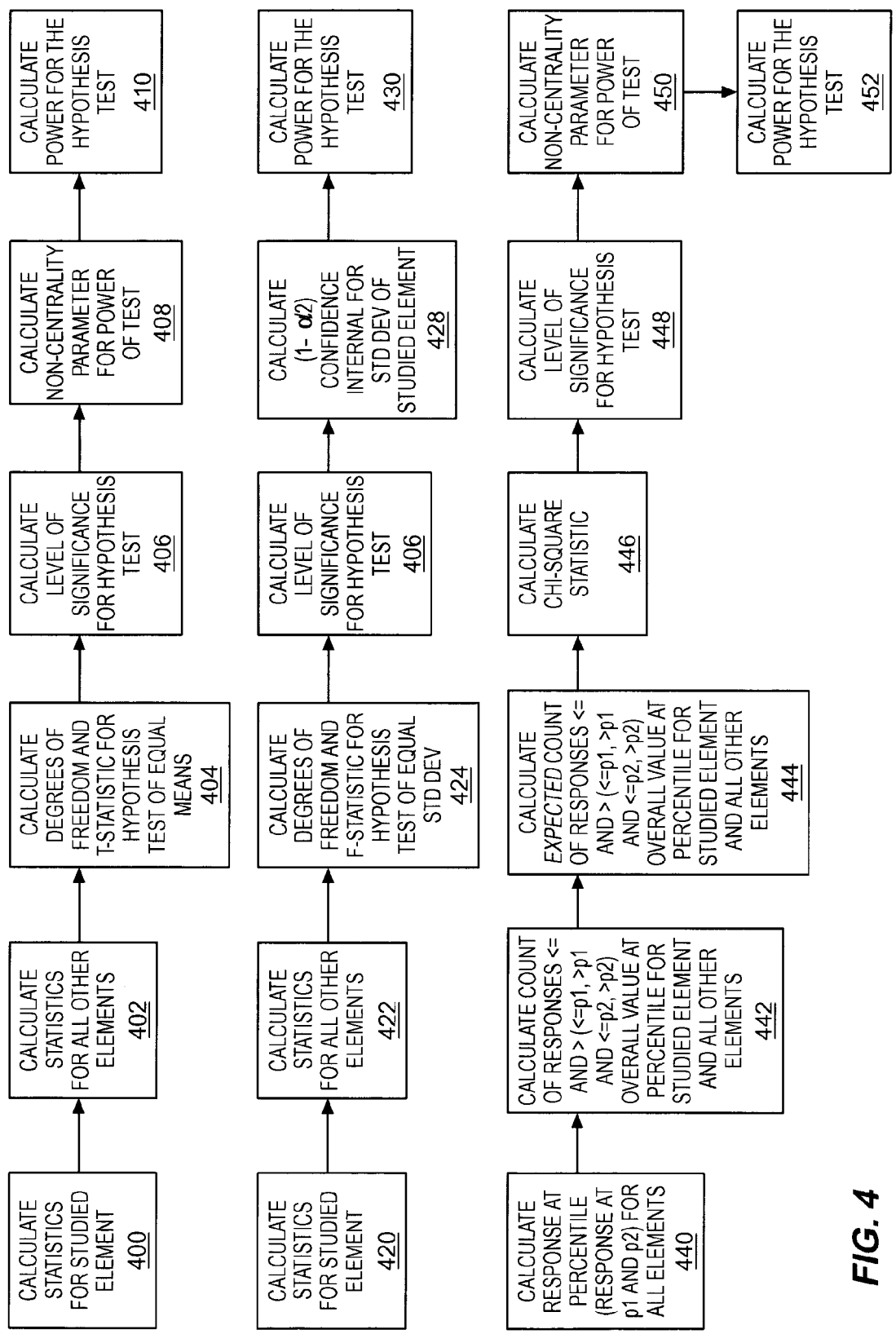
FIG. 4 is a flowchart providing additional details of the analysis described in FIG. 3.

FIG. 4 provides three flowcharts discussing particular statistical analysis examples (SSS procedures) for determining significance of an element with respect to one or more responses. Elements 400 through 410 describe an exemplary process for hypothesis testing the equality of the mean of a studied element and the mean of all other elements combined. Elements 420 through 430 describe a process for hypothesis testing the equality of a standard deviation of a studied element and the standard deviation of all other elements combined. Elements 440 through 452 describe a process for performing a 2×2 Chi-Square hypothesis test for equality of percentiles of a studied element and percentiles of all other elements combined. Those of ordinary skill in the art will recognize numerous other statistical measures for determining significance of identified elements as factors with respect to one or more identified responses. The particular statistical measures discussed herein with respect to FIG. 4 are therefore merely intended as exemplary of particular useful statistical measures for determining significance of a factor.

In determining the equality of the means between a studied element and all other elements combined, element 400 first calculates statistics relating to the studied element. Such statistics may be computed in accordance with the following equations:

$S_e$ (standard deviation of the responses for the studied element)

$= \sqrt{V_e}$ where $V_e$ (Variances of the studied element)

$$V_e \text{ (Variances of the studied element)} = \frac{N_e}{N_e - 1}\left[\frac{\sum x_i^2}{N_e} - \left(\frac{\sum x_i}{N_e}\right)^2\right]$$

where $x_i$ is the value of the i-th element and $N_e$ is the number of elements under study as a possible factor.

Element 402 then calculates statistics for all other elements combined in accordance with the following equations:

$S_{\neq e}$ (standard deviation of the responses for all other elements combined)

$S_{\neq e}$ (standard deviation of the responses for all other elements combined) $= \sqrt{V_{\neq e}}$ where $V_{\neq e}$ (Variances of all other elements)

$V_{\neq e}$ (Variances of all other elements) $= \dfrac{N_{\neq e}}{N_{\neq e}-1}\left[\dfrac{\sum x_i^2}{N_{\neq e}} - \left(\dfrac{\sum x_i}{N_{\neq e}}\right)^2\right]$ where $x_i$ is the value of the i-th element and $N_{\neq e}$ is the number of other elements (other than the element under study as a possible factor).

Element 404 next calculates the degrees of freedom and T-Statistics for the hypothesis test of equal means between the studied elements and all other elements combined according to the following equations:

$$T \text{ (T-Statistic)} = \dfrac{\left(\dfrac{\sum x_i}{N_e}\right) - \left(\dfrac{\sum x_i}{N_{\neq e}}\right)}{\sqrt{\dfrac{V_e}{N_e} + \dfrac{V_{\neq e}}{N_{\neq e}}}},$$

or as:

$$T \text{ (T-Statistic)} = \dfrac{\left(\dfrac{\sum x_i}{N_e}\right) - \left(\dfrac{\sum x_i}{N_{\neq e}}\right)}{\sqrt{\dfrac{S_p^2}{N_e} + \dfrac{S_p^2}{N_{\neq e}}}}$$

where $$S_p \text{ (Pooled Standard Deviation)} = \dfrac{(N_e - 1) \cdot V_e + (N_{\neq e} - 1) \cdot V_{\neq e}}{D}$$

and where $D$ (Degrees of Freedom)$=N_e+N_{\neq e}-2$

Element 406 next determines the level of significance for the hypothesis test in accordance with the following equations:

$L$ (level of significance)$=TDIST(T, D, 2)$ where TDIST is a standard statistical function for determining the probability (two-tailed) of two samples generating a T-Statistic$>=$T. Such a function is available in most commercial math libraries including, for example, Microsoft Excel.

Element 408 next determines the non-centrality parameter for power of the hypothesis test according to the following equations:

$$\delta \text{ (non-centrality parameter for power of the test)} = \dfrac{\left|\left(\dfrac{\sum x_i}{N_e}\right) - \left(\dfrac{\sum x_i}{N_{\neq e}}\right)\right|}{S_p} \sqrt{\dfrac{1}{\left(\dfrac{\sum x_i}{N_e}\right) + \left(\dfrac{\sum x_i}{N_{\neq e}}\right)}}$$

Lastly, element 410 calculates the power for the hypothesis test to thereby determine the significance of the studied element as the function:

Non-Central_FDIST(FINV(0.05),D),1,D,$\delta^2$)

where Non-Central_FDIST is a function to calculate the probability of two samples, with a non-centrality of $\delta$, generating a T-Statistic$>=$T and FINV is a function to perform the inverse function of FDIST discussed above also available in standard statistical libraries such as Microsoft Excel.

Those of ordinary skill in the art will readily recognize that the mean values computed above for the elements under study and for all other elements combined may be performed with weighting of the mean. For example, the mean of the elements under study, $$\dfrac{\sum x_i}{N_e},$$

may be expressed as a weighted mean as:

$$\dfrac{\sum x_i \cdot w_i}{\sum w_i}.$$

Similarly, the mean of the other elements combined, $$\dfrac{\sum x_i}{N_{\neq e}},$$

may be expressed as a weighted mean as:

$$\dfrac{\sum x_i \cdot w_i}{\sum w_i}.$$

Likewise, the above expressions of variances of the studied elements and variances of the other elements combined may be weighted and expressed as:

$$= \dfrac{\dfrac{N_e}{N_e - 1} \cdot \left(\dfrac{\sum (x_i \cdot w_i)^2}{N_e} - \left(\dfrac{\sum (x_i \cdot w_i)}{N_e}\right)^2\right)}{\left(\dfrac{\sum w_i}{N_e}\right)^2}, \text{ and}$$

-continued $$= \frac{\frac{N_{\ne e}}{N_{\ne e}-1} \cdot \left( \frac{\sum (x_i \cdot w_i)^2}{N_{\ne e}} - \left( \frac{\sum (x_i \cdot w_i)}{N_{\ne e}} \right)^2 \right)}{\left( \frac{\sum w_i}{N_{\ne e}} \right)^2},$$

respectively.

Such weighting in the computations allows for additional flexibility in the expression of statistical significance of an element.

In determining the equality of standard deviation between a studied element and all other elements combined, element 420 first calculates statistics related to the studied element. Such statistics may be computed in accordance with the following equations:

$$S_e \text{(standard deviation of the responses for the studied element)} = \sqrt{V_e}$$

where $$V_e \text{(Variances of the studied element)} = \frac{N_e}{N_e - 1} \left[ \frac{\sum x_i^2}{N_e} - \left( \frac{\sum x_i}{N_e} \right)^2 \right]$$

where $x_i$ is the value of the i-th element and $N_e$ is the number of elements under study as a possible factor.

Element 422 then calculates statistics for all other elements combined in accordance with the following equations:

$$S_{\ne e} \text{(standard deviation of the responses for all other elements combined)} = \sqrt{V_{\ne e}}$$

where $$V_{\ne e} \text{(Variances of all other elements)} = \frac{N_{\ne e}}{N_{\ne e} - 1} \left[ \frac{\sum x_i^2}{N_{\ne e}} - \left( \frac{\sum x_i}{N_{\ne e}} \right)^2 \right]$$

where $x_i$ is the value of the i-th element and $N_{\ne e}$ is the number of other elements (other than the element under study as a possible factor).

Element 424 next calculates the degrees of freedom and the F-Statistic for the hypothesis test of equal standard deviations between the studied elements and all other elements combined according to the following equations:

$$F \text{ (F-Statistic)} = \frac{MAX(V_e, V_{\ne e})}{MIN(V_e, V_{\ne e})}$$

where $D$ (Degrees of Freedom)$=N_e+N_{\ne e}-2$

Element 426 next determines the level of significance for the hypothesis test in accordance with the following equations:

$L$ (level of significance)$=(1-FDIST(1/F,D-1,1))+FDIST(F,D-1,1)$ where FDIST is a standard statistical function for determining the probability (two-tailed) of two samples generating a F-Statistic>=F. Such a function is available in most commercial math libraries including, for example, Microsoft Excel.

Element 428 next calculates a confidence interval of the standard deviation as the area bounded by $1-\alpha/2$ by the following equations:

Lower bound of $1-\alpha/2$, $$B_L = V_e \cdot \sqrt{\frac{N_e - 1}{CHIINV\left(\frac{\alpha}{2}, N_e - 1\right)}}, \text{ and}$$

Upper bound of $1-\alpha/2$, $$B_u = V_e \cdot \sqrt{\frac{N_e - 1}{CHIINV\left(1 - \frac{\alpha}{2}, N_e - 1\right)}}$$

where CHIINV is a function to perform the inverse of the one-tailed probability of the chi-squared distribution and may be available in standard statistical libraries such as Microsoft Excel.

Lastly, element 430 calculates the power for the hypothesis test to thereby determine the significance of the studied element as the function:

$$W1 = 1 - GAMMA\_CDF\left(x = (N_{\ne e} - 1) \cdot \left(\frac{B_L}{S_{\ne e}}\right)^2, \alpha = \frac{(N_{\ne e} - 1)}{2}, \lambda = \frac{1}{2}\right)$$

$$W2 = GAMMA\_CDF\left(x = (N_{\ne e} - 1) \cdot \left(\frac{B_U}{S_{\ne e}}\right)^2, \alpha = \frac{(N_{\ne e} - 1)}{2}, \lambda = \frac{1}{2}\right)$$

$W$ (Power)$=1-(W1-W2)$ where GAMMA_CDF is a function to perform the cumulative probability of the gamma distribution and may be available in standard statistical libraries such as Microsoft Excel.

Those of ordinary skill in the art will readily recognize that the mean values computed above for the elements under study and for all other elements combined may be performed with weighting of the mean. For example, the mean of the elements under study, $$\frac{\sum x_i}{N_e},$$

may be expressed as a weighted mean as:

$$\frac{\sum x_i \cdot w_i}{\sum w_i}.$$

Similarly, the mean of the other elements combined, $$\frac{\sum x_i}{N_e},$$

may be expressed as a weighted mean as:

$$\frac{\sum x_i \cdot w_i}{\sum w_i}.$$

Likewise, the above expressions of variances of the studied elements and variances of the other elements combined may be weighted and expressed as:

$$= \frac{\frac{N_e}{N_e-1} \cdot \left( \frac{\sum (x_i \cdot w_i)^2}{N_e} - \left( \frac{\sum (x_i \cdot w_i)}{N_e} \right)^2 \right)}{\left( \frac{\sum w_i}{N_e} \right)^2}, \text{ and}$$

$$= \frac{\frac{N_{\neq e}}{N_{\neq e}-1} \cdot \left( \frac{\sum (x_i \cdot w_i)^2}{N_{\neq e}} - \left( \frac{\sum (x_i \cdot w_i)}{N_{\neq e}} \right)^2 \right)}{\left( \frac{\sum w_i}{N_{\neq e}} \right)^2}, \text{ respectively.}$$

Such weighting in the computations allows for additional flexibility in the expression of statistical significance of an element.

In determining the equality of a 2×2 chi-square test (3×2 chi-square test for equality of SPAN and stability factor) between a studied element and all other elements combined, element 440 first calculates a response at percentile (response at p1 and p2) for all elements. Such statistics may be computed in accordance with the following equations:

R (response at P)=PERCENTILE([response data], (P))

where P is the percentage to test for statistically different percentiles between two samples. Response data is an identified Y element. PERCENTILE is a function to returns the P-th percentile of values in the response data range and may be available in standard statistical libraries such as Microsoft Excel.

Element 442 next calculates the count of responses less-than-or-equal and greater-than (i.e., less-than-or-equal-to p1, greater-than p1 and less-than-or-equal-to p2, greater-than p2) overall value at percentile for studied elements and all other elements. Such statistics may be computed in accordance with the following equations:

$_{<=}N_e$ is the count of responses less-than-or-equal P for studied elements;

$_{>}N_e$ is the count of responses greater-than P for studied elements;

$_{<=}N_{\neq e}$ is the count of responses less-than-or-equal P for all other elements; and $_{>}N_{\neq e}$ is the count of responses greater-than P for all other elements.

Element 444 next calculates the expected count of responses less-than-or-equal and greater-than (i.e., less-than-or-equal-to p1, greater-than p1 and less-than-or-equal-to p2, greater-than p2) overall value at percentile for studied elements and all other elements. Such statistics may be computed in accordance with the following equations:

$_{<=}E(N)_e$ is the expected count of responses less-than-or-equal $P$ for studied elements $$= \frac{(_{<=}N_e + _{<=}N_{\neq e}) \cdot (_{<=}N_e + _{>}N_e)}{N}$$

$_{>}E(N)_{=e}$ is the expected count of responses greater-than $P$ for studied elements;

$$= \frac{(_{>}N_e + _{>}N_{\neq e}) \cdot (_{<=}N_e + _{>}N_e)}{N}$$

$_{<=}E(N)_{\neq e}$ is the expected count of responses less-than-or-equal $P$ for all other elements;

$$= \frac{(_{<=}N_e + _{<=}N_{\neq e}) \cdot (_{<=}N_{\neq e} + _{>}N_{\neq e})}{N}$$

and $_{>}E(N)_{\neq e}$ is the expected count of responses greater-than $P$ for all other elements.

$$= \frac{(_{>}N_e + _{>}N_{\neq e}) \cdot (_{<=}N_{\neq e} + _{>}N_{\neq e})}{N}.$$

Element 446 then calculates the chi-square statistic as:

$$\chi^2 = \sum_{i=e,\neq e} \sum_{j=<=,>} \frac{(_j N_i - _j E(N)_i)^2}{_j E(N)_i}$$

Element 448 next calculates the level of significance of a hypothesis (e.g., percentile) test in accordance with the following equation:

λ(level of significance)

$=CHIDIST(\Omega^2, 1)$ where CHIDIST is a function to perform the one-tailed probability of the chi-squared distribution and may be available in standard statistical libraries such as Microsoft Excel.

Element 450 then calculates the non-centrality parameter for power of test according to the following equations:

$_{<=}\theta$ (effective size statistic for studied element responses less-than-or-equal $P$)

$$= \frac{\left(\frac{\leq N_e}{N_e} - P\right)^2}{P}$$

and $_{>}\theta$ (effective size statistic for studied element responses greater-than $P$)

$$= \frac{\left(\frac{\leq N_e}{N_e} - (1-P)\right)^2}{(1-P)}.$$

Element 452 then calculates the power of the hypothesis test in accordance with the following formula:

Power of Percentile

=Non-Central_$CHIDIST(0.05, dof=1, Ne*(_{\leq}\theta + _{>}\theta))$ where Non-Central_CHIDIST is a function to perform the two-tailed probability of the chi-squared distribution and may be available in standard statistical libraries such as Microsoft Excel.

Those of ordinary skill in the art will readily recognize that value of response P may be calculated using weighted values. For example, the equation R=PERCENTILE ([response data], (P)) may be replaced with R=WTPERCENTILE ([response data], [weights](P)) to perform similar percentile analysis where weights is the array of weightings for the associated response data.

Numerous aspects hereof are represented in a variety of user interface display screens and associated user interactions discussed further hereinbelow. In particular, a number of exemplary user interactions and related display screens associated with the steps of the flowchart of FIG. 12 are presented hereinbelow. User interaction may be based upon a control or home page display that serves as a central point of control for configuring and controlling operations. Those of ordinary skill in the art will recognize a number of possible designs and functions for such a central control user interface. Further, those skilled in the art will recognize numerous other user interface designs that may distribute control and configuration over any number of user interface screens.

Figure 5:
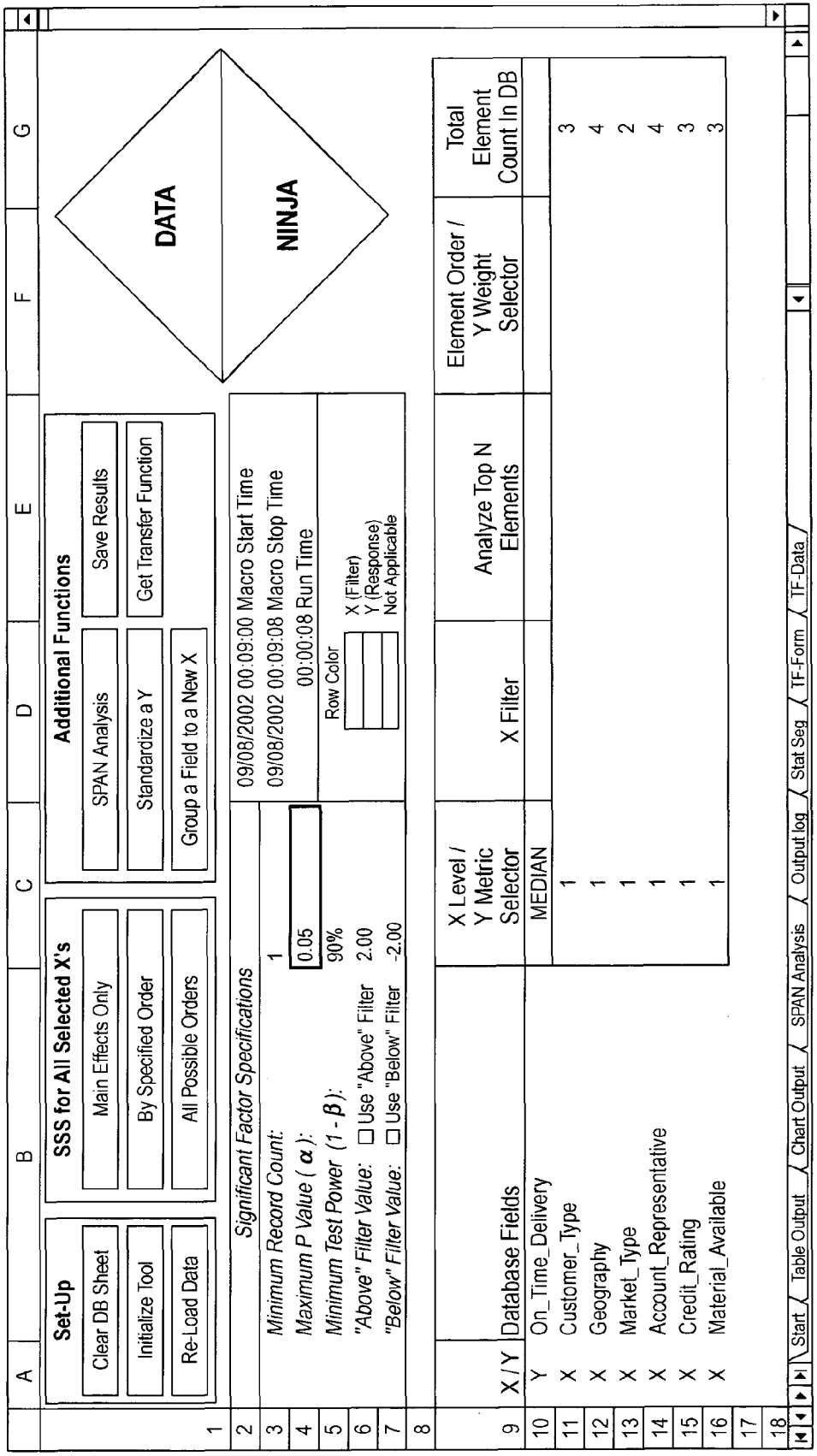
FIG. 5 is exemplary of a configuration and control display screen used for automated stratification and segmentation statistical analysis.

FIG. 5 is an exemplary user display presenting a graphical user interface for receiving user input associated with configuration and control of the statistical methods and elements associated herewith. In one embodiment, the user interface display of FIG. 5 may be generated and presented utilizing programming tools such as Microsoft Excel or other spreadsheet computational programs.

The configuration and control user interface display of FIG. 5 may include a number of control buttons as shown at the top portion of the exemplary user interface. Each of the control buttons provides a simple directive from the user to perform an associated operation. As shown in FIG. 5, the various buttons provided may also be grouped according to the general purpose of the corresponding button. For example, a first set of buttons as shown in FIG. 5 may be associated with "Set-Up" of the statistical tool. Set-Up buttons may include various administrative functions such as Clear DB Sheet to clear previously entered tabular data from the data page (as discussed further below). The Initialize Tool button performs various initializations to use the process. The Re-Load Data button may be used to retrieve previously loaded and saved data for continued analysis.

A second group of buttons ("SSS for All Selected X's") as shown in FIG. 5 relates to the SSS processing features. These buttons may activate associated processing to identify significant factors from among identified elements (X's) with respect to identified responses (Y's). Three exemplary buttons are shown for identifying Main Effects of various factors on a given response, for identifying a Specified Order of all effects or for identifying All Possible Orders of effects. These exemplary computational techniques are discussed above. The last group of buttons shown in FIG. 5 provides other statistical functionality when invoked by the user. Examples of such other statistical functions may include: Statistical SPAN Analysis; Standardizing a selected Y value (i.e., a response) to generate a new response field for statistical analysis; Grouping X elements in a manner that defines a new field for potential statistical analysis; and Generating a Transfer Function to fit a polynomial or other mathematical model to selected data.

In addition, as shown in FIG. 5, another link (shortcut button) may be provided to permit a control operation to Save a present state of computation results and loaded data for subsequent further analysis. Those of ordinary skill in the art will recognize a wide variety of functions that may be provided by such shortcut buttons in a graphical user interface. Further, those of ordinary skill in the art will recognize a wide variety of other user interface objects in addition to buttons that may be "clicked" using a pointer device. As noted elsewhere herein, voice recognition, simple textual command line interaction, and other forms of user interaction may be provided to receive configuration and control directives from a user.

In addition, as shown in FIG. 5, the configuration and control user interface display may include a portion identifying significant factor specifications. As noted above, one principal automated analysis provided identifies and ranks significance of a number of elements as potential factors associated with a response within user supplied tabular data.

In one example, a user first enters data to be analyzed and optionally further characterizes the data so entered. The user may enter data in simple tabular form. The data represents information to be processed by statistical methods for identifying significant factors and other statistical attributes of the supplied data. A user may first choose to clear old information from previous analysis by clicking the Clear DB Sheet button in the Set-Up portion of the configuration and control user input and display screen. As noted above, this function may clear a data page used for receiving user input specifying tabular data to be analyzed. The user may then enter the desired new tabular data in the data page of the user display.

Figure 6:
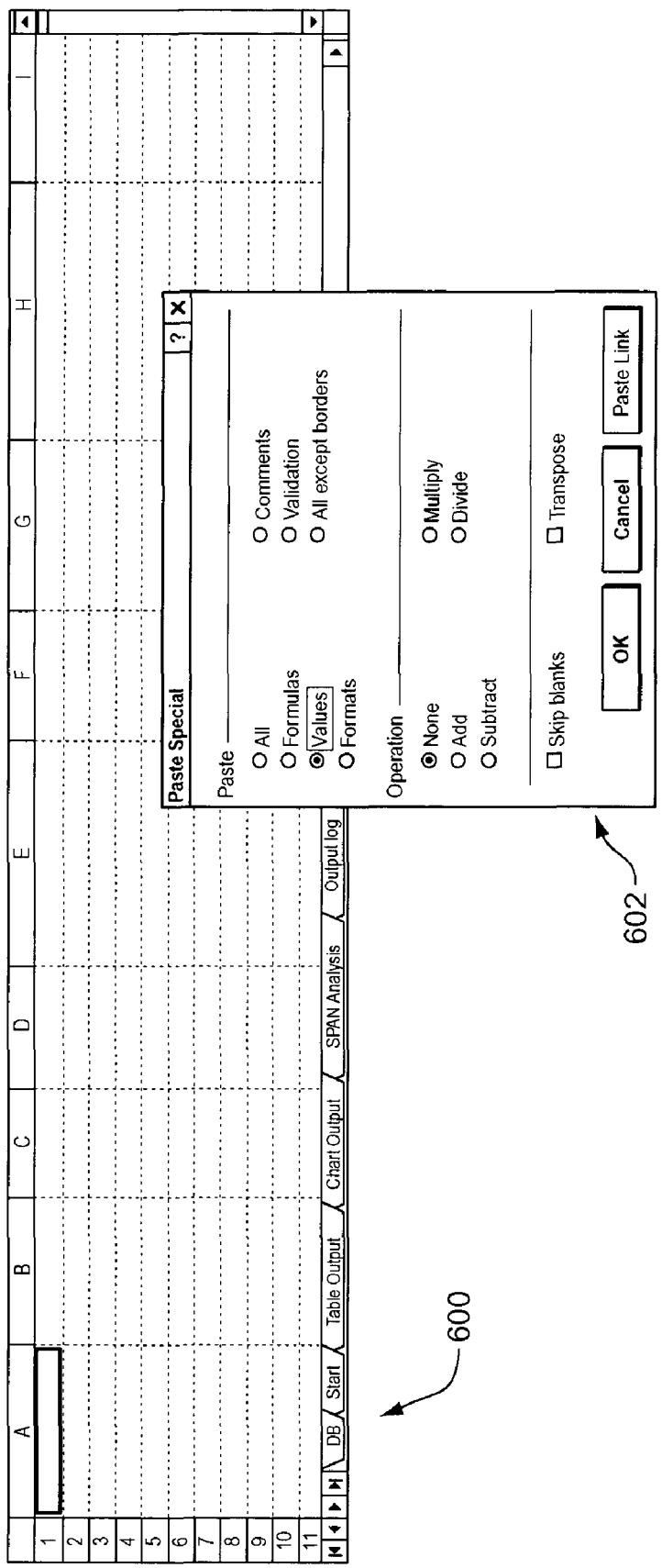
FIG. 6 is exemplary of a pop-up menu and associated data entry display screen useful for pasting tabular data into a data entry page.

FIG. 6 shows and exemplary user display screen for data entry as a blank spreadsheet page 600 in which user may enter tabular data. A user may manually enter such tabular data including any desired or required column headers through keyboard input, voice recognition input or other forms of textual and numeric input. In addition, a user may apply well-known techniques such as cutting and pasting or dragging and dropping to move or copy data from other sources into the data page. FIG. 6 also shows a pop-up dialog 602 that may be used to paste information from another data source into the data page. Such cut and paste and drag and drop user interface techniques are well-known to those of ordinary skill in the art.

Preferably, the data entered is formatted only in the sense that it contain rows of data with a column heading in the first row for each column. Further, the data may be edited to exclude blank fields or rows of data. In addition, the data may include at least one column representing response information. Such response information is preferably numeric data. The maximum size of information entered on the data page is limited only by the particular tools and other system limitations as implemented. Such design choices are well-known to those of ordinary skill in the art.

Figure 13:
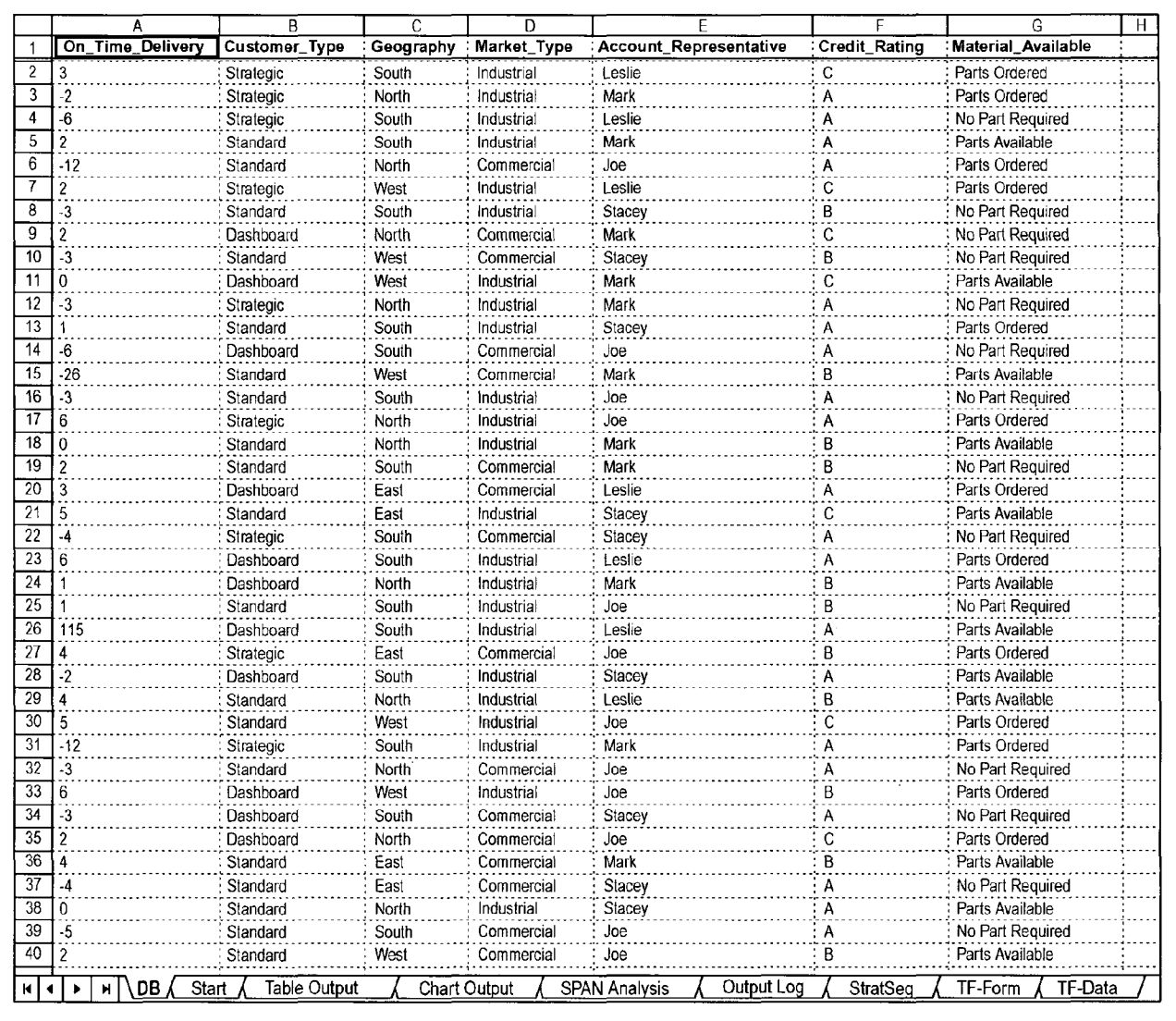

FIG. 13 shows an exemplary data page user display screen with sample data populating the columns and rows and showing appropriate column headers in row 1 of the data.

With user supplied data so populating the data page, such as in FIG. 13, a user may identify each field (i.e., column) of data on as an X type of value or as a Y type of value. An X type field is an element that may be evaluated as a factor with respect to an associated response. Y type fields are identified responses in the data for which corresponding elements are evaluated as factors. A field is identified on the configuration and control user display screen (discussed above) in a column labeled Database Fields. The Database Fields may correspond to the column headers entered by the user at the top row of each column in the data page as shown in FIG. 13.

FIG. 7 shows the configuration and control display screen with an exemplary collection of database fields derived from the sample data noted above with respect to FIG. 13. A portion 700 of the display screen of FIG. 7 is blown up to show more detail of exemplary user interaction to identify each database field as an X type or a Y type of field. As shown in the blown up portion 700 of FIG. 7, a pull down menu 702 allows a user to select "X" type or "Y" type for each database field identified in the data page. Numerous similar user interface techniques will be readily apparent to those of ordinary skill in the art.

As shown in FIG. 7, a user may explicitly define each field as either an X type or a Y type of field. Optionally, the types of each field of data may be derived automatically from the user supplied data where, for example, the tabular data explicitly identifies the type of each column of data. Further, the type of each field may be automatically determined based on heuristic information implied in the tabular user supplied data (i.e., the last column of tabular data is often presumed to be a response generated by factors represented in the preceding columns). Those of ordinary skill in the art will recognize numerous other techniques for manually and automatically identifying the type of each column or field of data in the tabular user supplied data.

Having so identified fields in the data page as either X or Y type, the user may click the Initialize Tool button in the Set-Up group on the configuration and control display (of FIGS. 5 and 7) to perform various initialization steps for the computation to be performed. Included in such initialization steps may be operations to retrieve identified data from the data page and reformat the data if and as required for more efficient access in further computations. Other types of initialization that may be useful will be readily apparent to those ordinary skill in the art.

A number of other buttons on the configuration and control display screen (of FIGS. 5 and 7) allow a user to further characterize the data and to configure options for the desired SSS procedures. Referring again to FIG. 12, element 1202 of FIG. 12 discusses numerous optional aspects of the user supplied data that may be provided by the user following entry of the data and the required identification of the selected relevant fields of data as either X or Y type values.

Figure 8:
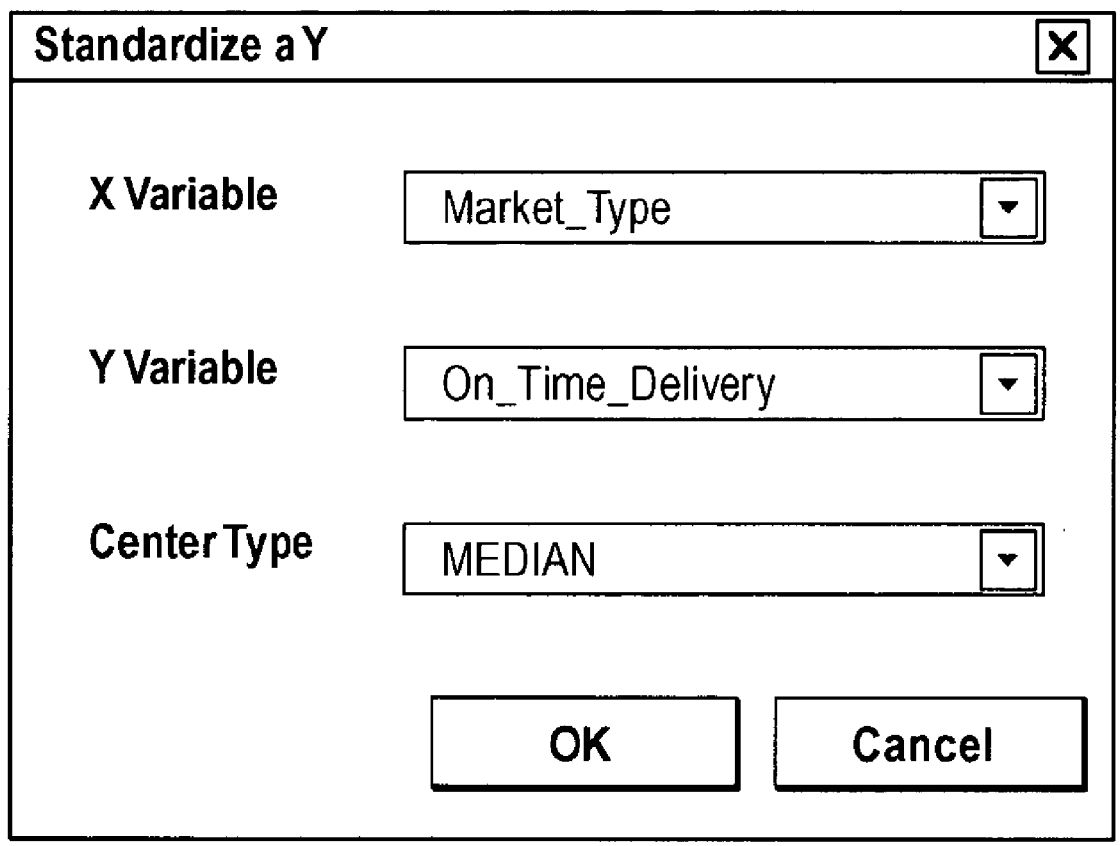
FIG. 8 is exemplary of a pop-up menu useful for entering information to standardize a Y type element.

A button on the configuration and control user input display screen (of FIGS. 5 and 7) allows a user to "Standardize a Y" type value (i.e., a response value). Standardizing a Y value is useful to create a new response value wherein the response value has been adjusted to remove variations due to a particular selected factor. Where a user knows in advance of a particular factor contributing to a selected response variable in the user supplied data, that factor may be removed by the process of standardizing the Y value of the response to create a new response value for further analysis devoid of the effects of the known factor. FIG. 8 shows a pop-up dialog box allowing a user to select a Y type value to be standardized and an X type value to be removed as a factor in the newly computed standardized response. In addition, a user may select a desired computational approach for identifying and removing the effect of the first known factor. Specifically, a user may select a type of centering to be used in isolating the effect of the identified factor. In general, the median response for each value of a first, known factor is determined. A standardized response is then determined as a difference between the actual response and the median response determined as above. This standardized response reveals more readily the effect of other factors on the newly determined standardized response and hence on the original response.

Figure 9:
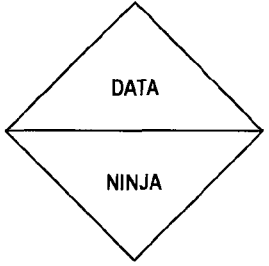
FIG. 9 is a version of the configuration and control display screen of FIG. 5 with additional detail showing addition of a standardized Y type element as a data field.

FIG. 9 shows the configuration and control user input display screen with a portion 900 blown up to show an additional Y type response variable added as determined by the processing to standardize a selected Y value. In particular, row 17 on the displayed configuration and control user input display page indicates the creation of a new Y type variable where effects of the "Market Type" factor has been removed from the "On-Time Delivery" response. A user may then select the standardized version of the On-Time Delivery for further analysis or may select the original non-standardized version for further analysis.

Yet another button selectable on the configuration and control user interface display screen (of FIG. 5) allows a user to categorize values of a selected X type element (i.e., a potential factor in generation of a corresponding response in the user supplied data). The "Group a Field to a New X" button enables the user to group values of an identified X element to define a new X element with discrete values corresponding to "buckets" (i.e., ranges) of the original X type element. Such a grouping of values of a potential factor may be useful in statistical analysis to determine the effect of particular ranges of levels of an X type variable as a factor in a corresponding identified response variable.

FIG. 10 depicts an exemplary pop-up dialog box in response to a user's selection of the "Group a Field to a New X" button on the configuration and control user input display screen (of FIG. 5). The dialog box of FIG. 10 allows a user to select a particular X type element from the user supplied data and categorize the values of that element into a new discrete field variable having a fixed number of discrete values corresponding to buckets in which the selected X type element values are sorted. A user may select any number of buckets allowed in accordance with a particular implementation. As shown in FIG. 10, up to ten categories may be defined by a user by entering the range of values for each of the defined categories. In one embodiment, a user may click a button on the screen identifying the number of desired categories to automatically define ranges of the values of the identified X type element. The automatically defined categories are defined such that each bucket receives an approximately equal number of X type element values within its defined range. Alternatively, the user may manually identify particular ranges of interest regardless of the number of values that fall into each identify range. Preferably, the defined ranges do not overlap skewing potential analysis of user supplied data.

FIG. 11 shows an exemplary configuration and control user input display screen with a blown up portion 1100 to show a newly defined X type element defined as a grouped version of the original X type element selected in the above discussed dialog box. In particular, row 17 of the exemplary configuration control user input screen shows such a newly defined grouped value as a potential X type element for further analysis.

Where ranges for the various buckets are defined such that some values of the selected X type element are excluded from all defined buckets, one design option allows for all such "other" values not falling into defined group buckets to be categorized as an "other" bucket. Those of ordinary skill in the art will readily recognize numerous equivalent structures for defining and utilizing such categories of values. In general, buckets may be used to define an element having discrete values corresponding to groups of values of a continuous element or to define a new discrete element corresponding to groupings of values of another discrete element. Numerous other useful applications of such a grouped data element will be readily apparent to those of ordinary skill in the art.

FIG. 14 shows a portion of the configuration and control user input display screen (of FIG. 5) wherein a user may define a desired metric for each identified Y type variable and an X level associated with each X type element. The X level associated with each X type element indicates the level of interaction analysis desired for the corresponding X type element. A level indicator of 1 indicates that the corresponding X type element is to be investigated as a main effect factor. A level indicator of 2 indicates that the corresponding X type element is to be investigated as a second-order interaction combined with any "significant" main effect factor as identified in level one. A level value of 3 indicates that the corresponding X type element be investigated for potential third order interactions with any "significant" second order effects determined as above. Level indicators may continue to any desired level to determine interactions with previous investigated earlier order interactions.

The Y metric selection shown in FIG. 14 allows a user to identify the type of statistical measure response represented by a corresponding identified Y type element. The user may identify the corresponding Y type element as, for example, any of the following types:

Y Statistical Measures
MEDIAN—Median of the dataset.
AVERAGE—Average of the dataset.
STD DEV—Standard Deviation of the dataset.
99-1 SPAN—Difference between 99th Percentile and 1st Percentile of the dataset.
95-5 SPAN—Difference between 95th Percentile and 5th Percentile of the dataset.
75-25 SPAN—Difference between 75th Percentile and 25th Percentile of the dataset.
STAB FAC—Stability factor=Q1/Q3
99 PCT—99th Percentile.
95 PCT—95th Percentile.
75 PCT—75th Percentile.
25 PCT—25th Percentile.
5 PCT—5th Percentile.
1 PCT—1st Percentile.

As noted above with respect to element 1202 of FIG. 12, a user may specify filters to limit the values analyzed for any identified X type element. FIG. 15 shows a portion of the configuration and control user input display screen as modified to show a highlighted section for the X filter data entry. A drop-down list is shown specifying the possible values of Market_Type as defined in the user supplied tabular data. The user's input may then select one or more of the identified values for the associated X type element. The selected values are then used as a filter in the analysis subsequently performed eliminating records from the tabular user supplied data not complying with the specified filter value.

If user supplied data has a particular field or column (i.e., an X type element) having a hundred or more distinct values or levels associated therewith, analysis may be dramatically slowed. Typically, such elements have a disproportionate distribution of records containing each of the distinct values. In other words, frequently the top N levels (i.e., most common discrete values) are clearly dominant factors while other values are equally clearly less significant as potential factors. In such a case, a user may provide input indicating that only the top N elements should be included in the desired analysis. FIG. 16 shows a portion of the configuration control user input display screen as updated to show a highlighted column wherein the user may specify that only the top N values of a corresponding element should be included in the statistical analysis to be performed. As shown in FIG. 16, the user has indicated that only the top 50 most frequently specified Customer_Type values should be included in the SSS procedure to be commenced.

Also shown in FIG. 16 is a column allowing a user to specify that weighted statistical measures should be utilized in the SSS procedure to be commenced rather than "standard" statistical measures. As noted above, element 1202 of FIG. 12 permits the user to specify use of such weighted statistical measures. For example, in analysis of a stock portfolio, a determination of average yield should be computed utilizing the number of shares of each stock as a weighting factor. As shown in FIG. 16, a column labeled Y Weight Selector allows a user to specify that the corresponding Y type element is computed using weighted statistical measures rather than standard statistical measures.

Element 1204 of FIG. 12 allows the user to customize specifications that aid in determining which factors are "significant" as compared to other factors identified in the user supplied tabular data. FIG. 17 shows a portion of the configuration and control user input display screen permitting a user to customize specifications for determining "significant" factors. For example, as shown in FIG. 17, a minimum count of records may be indicated as one of the specifications that identify a significant factor. Or, for example, significance of an element may be determined, in part, with reference to filters that assure values above or below specific filter values. FIG. 18 shows use of the "above" filter and the "below" filter to specify a range of significant factors as those which fall outside the specified range defined by the "above" and "below" values entered. Likewise, FIG. 19 shows a range defining significant factors as inside the range identified between the "above" and "below" filter values.

As noted above with respect to FIG. 12, a variety of SSS procedures are provided to permit computation of significance of various factors. Once user input has been supplied and characterized as discussed above, statistical analysis generates a resultant output which may be presented to the user in textual or graphical form. FIG. 20 shows an exemplary tabular output screen display indicating results of the statistical analysis performed at the user's direction. As shown in FIG. 20, a first column shows, for example, a median response measure based on the Y metric selected by the user. The main effect column shows, in order of degree of effect on the median response, the principal factors associated with the corresponding response in each row. The responses and associated factors may be color-coded to indicate specific statistical attributes. For example, responses higher then the "above" filter may be shown in red and responses lower then the "below" filter may be shown in blue. Other responses deemed to be significant with respect to the specified "above" and "below" filter ranges to may be coded in the default color.

Figure 21:
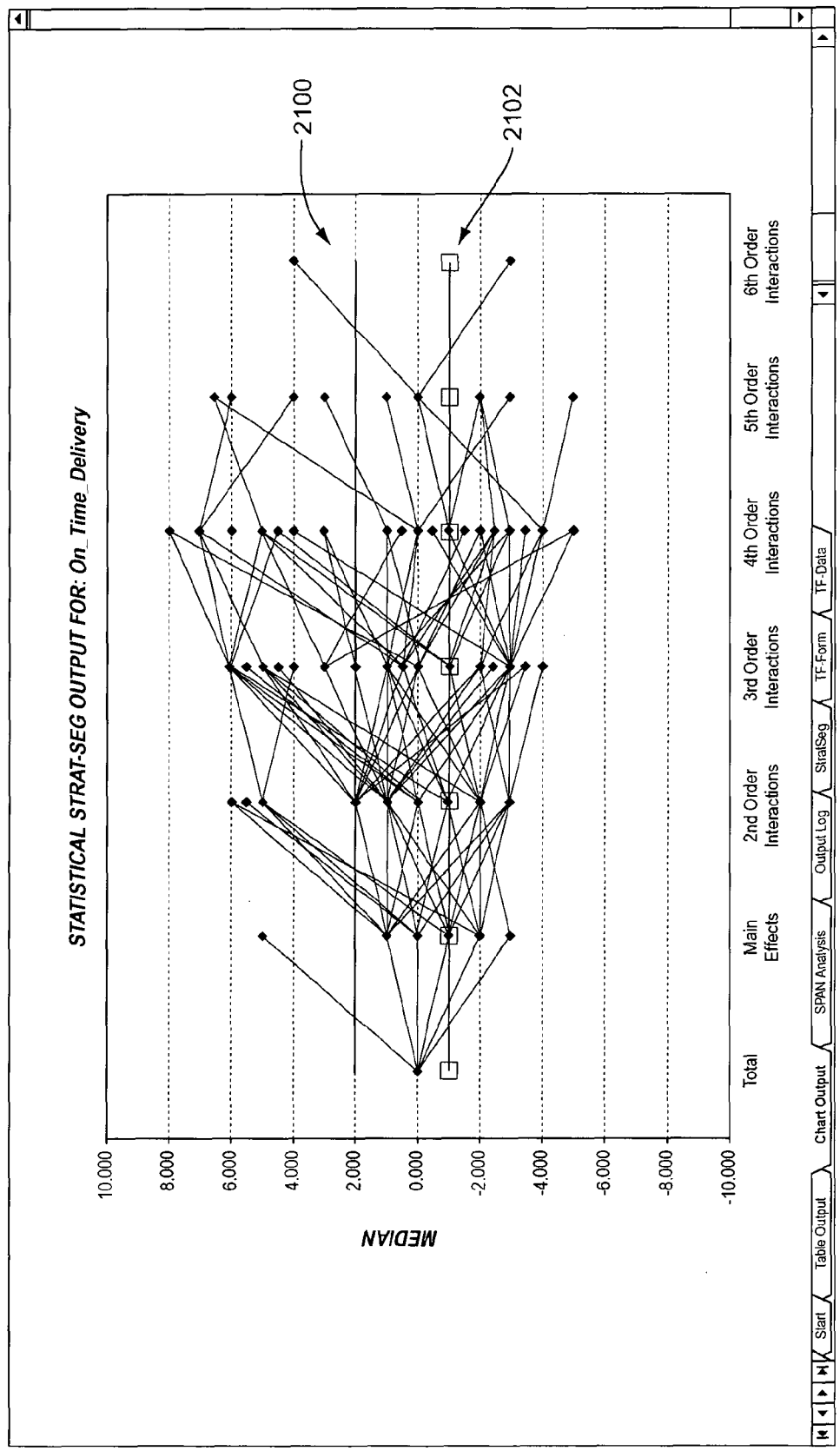
FIG. 21 is exemplary of a graphical output display of the results of stratification and segmentation statistical analysis.

FIG. 21 shows and exemplary graphical presentation of the results of the selected SSS procedure. The chart of FIG. 21 shows responses for each of the significant main effects and other higher order interactions. Each point represents a corresponding response as measured against the Y axis. As shown in FIG. 21, the response is a median response (i.e. median is selected as the Y metric of this response). The X axis for each point indicates whether the effect is a main effect, or other higher order interaction among the various effects. As noted above, color coding may be used to help indicate other statistical attributes of each computed response point. For example, a horizontal line 2100 signifies the "above" filter value and may help indicate response points exceeding the "above" filter value. A horizontal line 2102 signifies the "below" filter value and may help indicate response values less than the "below" filter value. Those of ordinary skill in the art will readily recognize numerous other graphical techniques for presenting such statistical data.

In another embodiment, the results of the SSS procedure may be used to generate a transfer function (i.e., mathematical model) useful for predicting Y type response values based on identified significant factors in the user supplied data. The user may select the "Get Transfer Function" button on the configuration and control screen discussed above to initiate a transfer function determination process. When the computation of the transfer function has completed, the generated transfer function may represent, for example, a polynomial with coefficients for each of the identified factors. Other statistical tools well-known to those of ordinary skill in the art may be used for the analysis of the quality of a fit and to improve the response of the transfer function.

Another form of statistical analysis available provides for SPAN analysis to determine key factors affecting a given response. In general, SPAN analysis proceeds by first testing each of the selected factors as possible main effects to see if there are significant levels associated therewith. Processing for determining such significant levels is as discussed above with respect to SSS procedures.

While the foregoing has been illustrated and described, such illustration and description is to be considered exemplary and not restrictive in character. Particular embodiments hereof have been shown and described. Those skilled in the art will appreciate variations of the above-described embodiments that fall within the scope hereof. As a result, the foregoing is not limited to the specific examples and illustrations discussed above, but only by the following claims and their equivalents.

What is claimed is:

1. A computer system user interface for statistical analysis comprising:

a data entry display screen configured to receive user input providing tabular data;

a configuration and control display screen configured to receive user input selecting a particular statistical analysis to be performed on the tabular data;

statistical computation means responsive to user input received in the configuration and control display screen to perform the particular statistical analysis using the tabular data entered by user input in the data entry display screen to generate statistical results wherein the statistical computation means is operable to retrieve and reformat the tabular data without user interaction; and a results page display screen responsive to the statistical computation means and to user input received in the configuration and control display screen to format and display results of the statistical analysis, wherein the statistical analysis is configured to find at least one statistically significant factor affecting a given response within the user input data based on the particular statistical analysis selected through the configuration and control display screen.

2. The user interface of claim 1 wherein the statistical computation means includes:

means for computing the particular statistical analysis as one or more of: mean of the response, median of a function response, standard deviation of a function response, 1st and 3rd quartile of a function response, stability factor of a function response, percentiles of a function response, percentile span of a function response, mean of the response using weighted data, median of the response using weighted data, standard deviation of the response using weighted data, 1st and 3rd quartile of the response using weighted data, stability factor of the response using weighted data, percentiles of the response using weighted data, percentile span of the response using weighted data, mean of the response for the top N elements, median of a function response for the top N elements, standard deviation of a function response for the top N elements, 1st and 3rd quartile of a function response for the top N elements, stability factor of a function response for the top N elements, percentiles of a function response for the top N elements, percentile span of a function response for the top N elements, mean of the response using weighted data for the top N elements, median of the response using weighted data for the top N elements, standard deviation of the response using weighted data for the top N elements, 1st and 3rd quartile of the response using weighted data for the top N elements, stability factor of the response using weighted data for the top N elements, percentiles of the response using weighted data for the top N elements, and percentile span of the response using weighted data for the top N elements.

3. The user interface of claim 1 further comprising:

a data store associated with the data entry display screen for persistent storage of the tabular data, wherein the statistical analysis computation means is operable to retrieve the tabular data from the data store.

4. A method comprising:

presenting a spreadsheet to a user on a display wherein the spreadsheet comprises a plurality of pre-defined pages;

receiving tabular data in a canonical form into a data page of the plurality of pre-defined pages;

receiving configuration input into a user interaction page of the plurality of pre-defined pages wherein the configuration input indicates a type of statistical analysis to be performed and indication of elements involved in the statistical analysis;

automatically reformatting the tabular data in accord with the type of statistical analysis without further user interaction;

automatically performing the indicated statistical analysis for all indicated elements without further interaction wherein the statistical analysis identifies a significant factor in the tabular data; and generating results of the statistical analysis in a result page of the plurality of pre-defined pages wherein the results identify the significant factor.

5. The method of claim 4 wherein the step of receiving configuration information comprises:

receiving user input identifying portions of the tabular data representing elements for the statistical analysis and user input identifying portions of the tabular data representing a response for the statistical analysis.

6. The method of claim 5 wherein the step of receiving configuration input further comprises:

receiving user input as the configuration input identifying the type of statistical analysis as one or more of: mean of the response, median of the response, standard deviation of the response, 1st and 3rd quartile of the response, stability factor of the response, percentiles of the response, and percentile span of the response.

7. The method of claim 4 wherein the step of generating results comprises:

generating results as tabular output in the results page.

8. The method of claim 4 wherein the step of generating results comprises:

generating results as graphical output in the results page.

9. The method of claim 4 wherein the step of receiving configuration input comprises:

receiving user input identifying relevant elements within the tabular data and a corresponding response within the tabular data.

10. The method of claim 4 wherein the step of performing the statistical analysis comprises:

determining a difference between the mean of a studied element of said relevant elements and all other elements of said relevant elements to determine significance of the studied element.

11. The method of claim 9 wherein the step of performing the statistical analysis comprises:

determining a difference between a standard deviation of a studied element of said relevant elements and all other elements of said relevant elements to determine significance of the studied element.

12. The method of claim 9 wherein the step of performing the statistical analysis comprises:

determining a difference between percentiles of a studied element of said relevant elements and all other elements of said relevant elements to determine significance of the studied element.

13. A computer readable storage medium tangibly embodying program instructions for a method, the method comprising:

presenting a spreadsheet to a user on a display wherein the spreadsheet comprises a plurality of pre-defined pages;

receiving tabular data in a canonical form into a data page of the plurality of pre-defined pages;

receiving configuration input into a user interaction page of the plurality of pre-defined pages wherein the configuration input indicates a type of statistical analysis to be performed and indication of elements involved in the statistical analysis;

automatically reformatting the tabular data in accord with the type of statistical analysis without further user interaction;

automatically performing the indicated statistical analysis for all indicated elements without further interaction wherein the statistical analysis identifies a significant factor in the tabular data; and generating results of the statistical analysis in a result page of the plurality of pre-defined pages wherein the results identify the significant factor.

14. The medium of claim 13 wherein the method step of receiving configuration information comprises:

receiving user input identifying portions of the tabular data representing elements for the statistical analysis and user input identifying portions of the tabular data representing a response for the statistical analysis.

15. The medium of claim 14 wherein the method step of receiving configuration input further comprises:

receiving user input as the configuration input identifying the type of statistical analysis as one or more of: mean of the response, median of the response, standard deviation of the response, 1st and 3rd quartile of the response, stability factor of the response, percentiles of the response, and percentile span of the response.

16. The medium of claim 13 wherein the method step of generating results comprises:

generating results as tabular output in the results page.

17. The medium of claim 13 wherein the method step of generating results comprises:

generating results as graphical output in the results page.

18. The medium of claim 13 wherein the method step of receiving configuration input comprises:

receiving user input identifying relevant elements within the tabular data and a corresponding response within the tabular data.

19. The medium of claim 18 wherein the method step of performing the statistical analysis comprises:

determining a difference between the mean of a studied element of said relevant elements and all other elements of said relevant elements to determine significance of the studied element.

20. The medium of claim 18 wherein the method step of performing the statistical analysis comprises:

determining a difference between a standard deviation of a studied element of said relevant elements and all other elements of said relevant elements to determine significance of the studied element.

21. The medium of claim 18 wherein the method step of performing the statistical analysis comprises:

determining a difference between percentiles of a studied element of said relevant elements and all other elements of said relevant elements to determine significance of the studied element.

22. A method comprising:

receiving user input identifying desired analysis;

retrieving user data from a data store;

reformatting the user data in accordance with the desired analysis;

computing factors for the desired analysis;

formatting output from results of the computation for presentation to the user; and presenting the output to the user in response to input from the user requesting output presentation, wherein the steps of retrieving, reformatting, computing and formatting are automated, responsive to the step of receiving and otherwise substantially devoid of interaction with the user for receiving input, wherein the computing of factors for the desired analysis comprises finding statistically significant factors affecting a given response within the user data based on the identified desired analysis.

23. A computer readable storage medium tangibly embodying program instructions for a method, the method comprising:

receiving user input identifying desired analysis;
retrieving user data from a data store;
reformatting the user data in accordance with the desired analysis;
computing factors for the desired analysis;
formatting output from results of the computation for presentation to the user; and
presenting the output to the user in response to input from the user requesting output presentation,
wherein the method steps of retrieving, reformatting, computing and formatting are automated, responsive to the method step of receiving and otherwise substantially devoid of interaction with the user for receiving input.
wherein the computing of factors for the desired analysis comprises finding statistically significant factors affecting a given response within the user data based on the identified desired analysis.

24. A method implemented by a computer system comprising:

receiving data through a data entry display screen mechanism;
receiving configuration input through a configuration and control display screen mechanism, wherein the configuration input indicates:
a type of statistical analysis to be performed; and
an indication of factor-type X elements and at least one response-type Y element associated with the received data;
performing the indicated statistical analysis for all indicated elements, wherein the statistical analysis identifies a significant factor among the indicated factor-type X elements with respect to said at least one identified response-type Y element; and
generating results of the statistical analysis, wherein the results identify the significant factor.

25. The method of claim 24 wherein the receiving an indication of factor-type X elements and said at least one response-type Y elements comprises indicating respective types of the elements within a tabular display of the elements.

26. The method of claim 24 wherein the receiving of the configuration input further comprises:

receiving an instruction that governs processing to identify significant factors from among identified response-type X elements with respect to an identified response-type Y element, the instruction comprising one of:
an instruction to identify main effects of various factors on the identified response-type Y element;
an instruction to identify a specified order of all effects; and
an instruction to identify all orders of effects.

27. The method of claim 24 wherein the receiving of the configuration input further comprises:

receiving an instruction to standardize an identified factor-type Y element by removing an effect of an identified factor-type X element on the identified response-type Y element.

28. The method of claim 24 wherein the receiving of the configuration input further comprises:

receiving an instruction to categorize an identified factor-type X element into a discrete range of values of the factor-type X element.

29. The method of claim 24 wherein the receiving of the configuration input further comprises:

identifying an X level associated with a desired level of interaction analysis for an identified factor-type X element.

30. The method of claim 24 wherein the receiving of the configuration input further comprises:

identifying a type of statistical measure response represented by an identified response-type Y element, the type of statistical measure response defining the type of statistical analysis to be performed.

31. The method of claim 24 wherein the receiving of the configuration input further comprises:

identifying a filter that limits values analyzed for an identified factor-type X element.

32. The method of claim 24 wherein the receiving of the configuration input further comprises:

identifying N top levels to be included in the statistical analysis for an identified factor-type X element.

33. The method of claim 24 wherein the receiving of the configuration input further comprises:

identifying, for an identified response-type Y element, whether a weighted statistical measure should be used, as opposed to a standard statistical measure.

34. The method of claim 24 wherein the receiving of the configuration input further comprises:

allowing a user to customize specifications that aid in determining which response-type X elements are significant as compared to other response-type X elements.

35. The method of claim 24 further comprising, via the configuration and control display mechanism, providing an instruction to derive a transfer function based on the results of the statistical analysis.

36. The method of claim 24 further comprising presenting the generated results in a tabular-type presentation, the tabular-type presentation showing main effects and higher-order effects.

37. The method of claim 24 further comprising presenting the generated results in a graphical-type presentation, the graphical-type presentation showing main effects and higher-order effects.

38. A computer readable storage medium tangibly embodying program instructions which implement a method when performed by a computer system, the method comprising:

receiving data through a data entry display screen mechanism;
receiving configuration input through a configuration and control display screen mechanism, wherein the configuration input indicates:

a type of statistical analysis to be performed; and an indication of factor-type X elements and at least one response-type Y element associated with the received data;

performing the indicated statistical analysis for all indicated elements, wherein the statistical analysis identifies a significant factor among the indicated factor-type X elements with respect to said at least one identified response-type Y element; and generating results of the statistical analysis, wherein the results identify the significant factor.

* * * * *